(12) United States Patent
Paradise, Jr. et al.

(10) Patent No.: US 10,870,815 B2
(45) Date of Patent: Dec. 22, 2020

(54) THERMALLY-PROTECTIVE MATERIAL AND COOL-TOUCH CANDLE ASSEMBLIES PREPARED THEREWITH

(71) Applicants: Richard E. Paradise, Jr., Bristol, CT (US); Todd Alexander Sowa, Clinton, MA (US)

(72) Inventors: Richard E. Paradise, Jr., Bristol, CT (US); Todd Alexander Sowa, Clinton, MA (US)

(73) Assignee: Room For Nature LLC, Clinton, MA (US)

( * ) Notice: Subject to any disclaimer, the term of this patent is extended or adjusted under 35 U.S.C. 154(b) by 210 days.

(21) Appl. No.: 15/358,043

(22) Filed: Nov. 21, 2016

(65) Prior Publication Data

US 2017/0146230 A1    May 25, 2017

Related U.S. Application Data

(60) Provisional application No. 62/258,050, filed on Nov. 20, 2015.

(51) Int. Cl.
| | |
|---|---|
| *C11C 5/00* | (2006.01) |
| *C09J 7/20* | (2018.01) |
| *C08K 7/06* | (2006.01) |
| *C08K 3/08* | (2006.01) |

(52) U.S. Cl.
CPC ............ *C11C 5/002* (2013.01); *C09J 7/20* (2018.01); *C11C 5/006* (2013.01); *C11C 5/008* (2013.01); *C08K 3/08* (2013.01); *C08K 7/06* (2013.01); *C09J 2203/334* (2013.01); *C09J 2205/102* (2013.01); *C09J 2427/00* (2013.01)

(58) Field of Classification Search
CPC ............................................ C09J 7/00
USPC ................................. 431/288-297
See application file for complete search history.

(56) References Cited

U.S. PATENT DOCUMENTS

| | | | | |
|---|---|---|---|---|
| 3,312,563 | A | * | 4/1967 | Rusch ............... B32B 27/00 428/207 |
| 3,591,400 | A | * | 7/1971 | Palmquist et al. ............. A41D 31/0011 2/81 |
| 2002/0119292 | A1 | * | 8/2002 | Venkatasanthanam ... B32B 3/28 428/174 |
| 2011/0228391 | A1 | * | 9/2011 | Bacon, Jr. ............. G02B 5/124 359/529 |

* cited by examiner

*Primary Examiner* — Vivek K Shirsat
(74) *Attorney, Agent, or Firm* — JWIP & Patent Services, LLC; Jacob G. Weintraub, Esq.

(57) ABSTRACT

The present invention relates to materials and systems useful for increasing the safety profile of a candle. In particular, the present invention provides a thermally-protective material that is useful to prepare labels or wraps to encircle or surround a candle. The present invention further provides a cool-touch thermally-protected candle assembly.

19 Claims, No Drawings

THERMALLY-PROTECTIVE MATERIAL AND COOL-TOUCH CANDLE ASSEMBLIES PREPARED THEREWITH

RELATED APPLICATION

This application claims benefit to U.S. Provisional Patent Application Ser. No. 62/258,050 filed on Nov. 20, 2015, the contents of which are incorporated herein by reference in its entirety.

BACKGROUND OF THE INVENTION

The dynamics of a burning candle are far more complex than meets the eye. While it is easily appreciated that the flame of a candle is inherently dangerous, it is less easily appreciated that multiple parameters of candle construction affect the flame of any given candle, thus affecting the overall safety of any given candle. Fuel type, wick size, number, and type, container size, material, and shape, fragrance, additives, and colorants are just a few of the many components that can vary from candle to candle, affecting the flame and safety of any given candle. The safety of a burning candle is inextricably linked to and affected by each of these parameters.

Modern efforts to improve candle safety have focused upon fuels, wicks, and containers. Candles are often made of paraffin wax, however current trends include using natural waxes as part of, to all of, candle fuel formulations. Wicks can vary greatly in composition and size, both of which affect the ability of the flame to melt and burn wax. The size, shape, and composition of a candle container also affects the burning of wax and wick combinations. Glass containers are by far the most popular container for candles. However, glass containers can get quite hot to the touch and have even been known to shatter; clearly a dangerous occurrence when the wax is molten and the flame is lit.

Conventional candles often burn so poorly as to negatively affect consumer enjoyment of the candle experience. Inefficiently burning candles can exhibit uneven scent throw such that the consumer cannot enjoy a consistent fragrance experience. Additionally, inefficiently burning candles may tunnel, reducing scent throw, burn time, and the ability to see and appreciate the candle flame.

Despite modifications in wax, wicks, and containers, candles remain inherently risky to operate in a safe manner. The poor burning efficiency of conventional candles fail to provide the consumer with the most enjoyable candle experience Thus, there is a need in the art for components useful to improve the safety profile and experience profile of a candle.

SUMMARY OF THE INVENTION

The present invention relates to materials and systems useful for increasing the safety profile of a candle, e.g., a burning candle, or e.g., a candle in which the wax is semi-solid, semi-soft, soft, or molten. In particular, the present invention provides thermally-protective materials (TPM) that are useful to prepare labels or wraps to encircle or surround a candle, e.g., a container candle. The present invention thus provides thermally-protective candle wraps or labels (TPWL) that reflect and resist the absorption of heat prepared from a TPM of the invention. When encircling or surrounding a container candle, the thermally-protective wraps or labels of the invention increase the safety profile of and enhance the experience profile of the candle. The present invention further provides a cool-touch thermally-protected candle assembly (CTCA) comprising a container, a fuel, and at least one wick, where the container is encircled or surrounded by a label or wrap prepared from a TPM of the invention.

Accordingly, one aspect of the present invention provides a thermally-protective material (TPM) that resists the absorption of heat comprising at least one layer of adhesive vinyl material comprising metal flecks and at least one layer of a UV protective material, an abrasion resistant material, or a dual-property UV protective and abrasion resistant material, where the layers of material are thermally assembled to form the TPM of the invention. The vinyl material of the TPM may be printed upon, e.g., with thermally applied translucent foil ink, or e.g., with solvent ink. At least one layer of the TPM is translucent or transparent.

Another aspect of the present invention provides a cool-touch thermally-protective candle wrap or label (TPWL) which, when encircling or surrounding a candle in use, increases the safety or enjoyment profiles of the candle. In one embodiment, the cool-touch thermally-protective candle wrap or label (TPWL) encircling or surrounding a candle in use, reduces the maximum exterior temperature reached by the candle. In another embodiment, the cool-touch thermally-protective candle wrap or label (TPWL) encircling or surrounding a candle in use, reduces the maximum molten wax temperature reached by the candle. In one embodiment, the cool-touch thermally-protective candle wrap or label (TPWL) encircling or surrounding a candle in use, increases the burn time of the candle.

Another aspect of the present invention provides a cool-touch thermally-protected candle assembly (CTCA). The CTCA of the invention comprises a fuel, e.g., wax, e.g., soy wax, a container, e.g., a glass or tin container, and at least one wick, e.g., a cotton core wick, housed in a container that is encircled or surrounded by the TPM or a TPWL of the invention. In one embodiment, the fuel of the CTCA, e.g., wax, e.g., soy wax, is a combustible and/or meltable fuel. In one embodiment, the fuel of the CTCA, e.g., wax, e.g., soy wax, further comprises an odorant. In one embodiment, the fuel of the CTCA, e.g., wax, e.g., soy wax, further comprises a colorant, e.g., a dye or pigment. In one embodiment, the fuel of the CTCA, e.g., wax, e.g., soy wax, further comprises an odorant and a colorant.

Another aspect of the present invention provides a safety-enhanced cool-touch thermally-protective candle.

Another aspect of the present invention provides an experience-enhanced cool-touch thermally-protective candle.

Additionally, the present invention provides materials and methods for repairing tunneled candles to a burnable and useable form.

DETAILED DESCRIPTION OF THE INVENTION

Candle wax, wick, and container compositions have been altered over the years in an attempt to increase the safety profile of, and improve the enjoyment experience of, a candle in use. In contrast, the material composition of candle labels or wraps has received little attention with regard to enhancing the safety and experience profiles of a candle.

Labels are a common feature of candle packaging, informing the consumer as to the scent of the candle, providing safe use instructions, and are usually visually appealing and decorative. Paper and vinyl label materials available today, however, fail to increase the safety profile of a candle and fail to enhance the overall candle experience. Paper and vinyl labels may also discolor or detach, becoming unappealing to the consumer.

Consumers are increasingly purchasing candles made from natural wax sources, e.g., soy wax, that are fitted with wicks free of fillers or metal cores, e.g., a pure cotton wick. Such "natural" candles, e.g., comprising pure soy wax and pure cotton wicks, are difficult to burn evenly; a candle which burns unevenly cannot provide the consumer with maximum safety and enjoyment.

The present invention fills a need in the candle art, which currently lacks a label or wrap material, e.g., the TPM or a TPWL of the invention, to increase the safety profile of a candle. The TPM or a TPWL of the invention, when encircling or surrounding a candle in use, e.g., a container candle, e.g., a container candle comprising pure soy wax and a pure cotton wick, reduces the maximum exterior and molten wax temperatures reached by the candle in use. The TPM or a TPWL of the invention, when encircling or surrounding a candle, also increases the shatter-resistance of a container candle assembly.

The present invention fills a second need in the candle art, which currently lacks a label or wrap material, e.g., the TPM or a TPWL of the invention, to increase the candle experience profile. The TPM or a TPWL of the invention are visually appealing and decorative, and in translucent form, provide attractive and functional safety protection by allowing the consumer to view and enjoy the candle flame from all sides of a clear, e.g., glass, candle container. The TPM or a TPWL of the invention, when encircling or surrounding a candle in use, e.g., a container candle, e.g., a container candle comprising pure soy wax and a pure cotton wick, increases the number of hours a candle may burn before exhausting the fuel source, thus extending the useful life of the candle. The TPM or a TPWL of the invention, when encircling or surrounding a candle in use, e.g., a container candle, e.g., a container candle comprising pure soy wax and a pure cotton wick, not only increases the hot throw of a candle in use, it provides a more constant and consistent dispersal of fragrance.

Also, the TPM or a TPWL of the invention, when encircling or surrounding a container housing a lit but tunneled candle, restores the candle to an even pool of wax, allowing the consumer to continue to burn what would otherwise become an unburnable candle.

The present invention will be described with reference to the following definitions that, for convenience, are set forth below. Unless otherwise specified, the below terms used herein are defined as follows:

I. Definitions

As used herein, the terms "a," "an," "the" and similar terms used in the context of the present invention (especially in the context of the claims) are to be construed to cover both the singular and plural unless otherwise indicated herein or clearly contradicted by the context.

The term "about" is used herein in reference to the degree or extent of the term which it modifies, and that such extent may be 100% or near to but not exactly 100% of the modified term; industry accepted standards will assist in defining the quantitative aspects of how "near" 100% is defined. In particular embodiments, the term "about" indicates ±2%, ±1% or ±0.5%. In a particular embodiment, for example, the language "about 19%" would be exactly 19%. In an alternative particular embodiment, for example, the language "about 19%" would mean 19%±1%.

The term "candle" is art recognized, and is used herein to describe any combination of a fuel and at least one wick, e.g., pure soy wax and a cotton wick, or e.g., a liquid oil and a wick. Candles are available in many shapes, sizes, and types, including, but not limited to, container candles, tapers, pillars, votives, gel, oil, and hurricane candles, and may further comprise an odorant, a colorant, or other additives.

The phrases "candle assembly" or "container candle" are used interchangeably herein to describe all parts of a candle housed within and used within a container, e.g., a glass jar or a metal tin. Thus a candle assembly or container candle includes the contents of a candle assembly as a whole including, but not limited to fuels, wicks, odorants, colorants, UV-inhibitors, oxidation inhibitors, color stabilizers, fragrance stabilizers, color brighteners, wax hardness enhancers, stearic acid, and the like, the container housing the contents of the candle assembly, and any labels, wraps, or other securely attached adornments.

The phrases "contents of a candle assembly" or "contents of a container candle" are used herein to describe any and all parts of a candle taken as a whole, which is housed within a container. The contents of a candle assembly include, but are not limited to fuels, wicks, odorants, colorants, UV-inhibitors, oxidation inhibitors, color stabilizers, fragrance stabilizers, color brighteners, wax hardness enhancers, stearic acid, and the like.

The term "combustion" is art recognized, and is used herein to describe the chemical reaction that occurs when, in the presence of oxygen, another substance combines with said oxygen in a usually rapid chemical process to produce heat and usually light, e.g., an act or instance of burning. An item or substance is said to be "combustible" if it is able to be burned easily, e.g., a fuel, e.g., the wax fuel of a candle.

The term "cool-touch" is used herein to describe the feature or condition of an item comprising a component that, when under identical conditions, causes that item to feel cooler to the touch than an identical item lacking the component. For example, when in use, a cool-touch thermally-protected candle assembly according to the invention exhibits a cooler external temperature, e.g., the container is cooler to the touch, than an identical candle assembly lacking a TPWL prepared from the TPM of the invention as described herein.

The term "diffusion" is art recognized, and is used herein to describe the spreading out of a parameter into space, e.g., light, heat or sound. A parameter moving in different directions, e.g., spreading apart in multiple different directions, and thus not concentrated in one area, is said to have diffused. For example, the TPM of the invention reflects heat, e.g., heat from a candle flame, back into the contents of a candle assembly, e.g., the fuel, e.g., liquid or solid wax, allowing the heat to disperse within the contents of a candle assembly, e.g., the fuel, providing for even heating of the contents of a candle assembly, e.g., the fuel.

The term "encircle" is art recognized, and is used herein to describe the feature and ability of an item, e.g., the TPM or a TPWL of the invention, to form around or fully extend around another item, e.g., a container housing a candle. As used herein, the term "encircle" is not limited to describing the feature and ability of an item to form only a circle around only a circular or cylindrical item, but to encompass the feature and ability of the item, e.g., the TPM or a TPWL of the invention, to conform to the shape of the item, e.g., a round, square, hexagonal, or triangular glass or metal container.

The term "essential oil" is art recognized, and is used herein to describe a natural oil that is harvested and/or extracted from a plant source. Essential oils may be harvested from many parts of a plant, including but not limited to, the blossom, leaf, fruit, bark, stem, or resin of a plant. Essential oils may be extracted from plant material by steam distillation, solvent extraction, expression, absolute oil extraction, resin tapping, cold pressing, and the like, and may comprise tens to hundreds to thousands of naturally occurring chemicals.

The term "even burning" is used herein to describe the property of a burning candle to generate and maintain enough heat to a) create a pool of wax, and b) to heat the pool of wax such that the wax is melted and molten until meeting all edges of the container housing a candle. In other words, a candle burning evenly does not exhibit a ring or build up of unburned wax along the sides of the candle container.

The phrase "experience-enhanced candle" is used herein to describe a candle providing an enhanced, improved, or more enjoyable experience profile as described herein.

The phrase "experience profile" is used herein to describe the feature and ability of an item, e.g., a cool-touch thermally-protected candle assembly (CTCA), to be enjoyable to use. The phrases "increased experience profile" or "enhanced experience profile" are used herein to describe the feature and ability of an item, e.g., a cool-touch thermally-protected candle assembly (CTCA), to be more enjoyable to use than a similar item e.g., a candle assembly that is not surrounded by the TPM or a TPWL of the invention. The experience profile, and thus the increased experience profile, of a candle, e.g. of the CTCA of the invention, may be measured and assessed by any number of parameters, including, but not limited to, increased hot throw, decreased tunneling, restoration of a tunneled candle to a burnable and useful form, increased even burning of a pure soy wax and pure cotton wick candle, increased number of hours of burn time, more constant and consistent dispersal of fragrance, improved label or wrap integrity, improved viewing of the candle flame at all times, or any combination thereof.

The term "flashpoint" is art recognized, and is used herein to describe the lowest temperature at which the vapors above a volatile, combustible substance, e.g., a fragrance, will ignite in air upon exposure to a flame or spark.

The term "fragrance oil" is art recognized, and is used herein to describe a synthetically produced, volatile odorant oil that lacks, in part or in whole, natural essential oils. Synthetically produced components of fragrance oils, e.g., aroma chemicals, may mimic aromas occurring in nature, e.g., linalool mimics lavender, benzaldehyde mimics almond, geranyl acetate mimics rose.

The term "fuel" is used herein to describe a combustible material ignitable by a flame or spark. Fuel, e.g., for a candle, may be liquid, semi-soft, soft, semi-solid, or solid at room temperature, e.g., approximately 75° F. and approximately 50% humidity, in its unlit or unheated form, e.g., an oil or a wax. A solid fuel may become semi-solid, semi-soft, soft, or liquid upon exposure to high temperatures, e.g., 100°-200° F. or higher, or to a flame, e.g., a candle flame; a solid fuel that becomes semi-solid, semi-soft, soft, or liquid upon such is exposure is said to be "meltable" or a "meltable fuel".

The term "heat-resistant glass" is known in the art, and is used herein to describe a type of glass that has been treated or modified to be more resistant or tolerant to heat than untreated or unmodified glass. Heat resistant glass is resistant to thermal shock and able to withstand very high temperatures, e.g., 1000° C. Types of heat resistant glass include, but are not limited to, chemically tempered glass, borosilicate glass, e.g., PYREX® glass, PYROCERAM® glass, quartz glass, ROBAX® glass, tempered glass, VYCOR® glass, and the like. Heat resistant glass candle containers are suitable for use in preparing the CTCA of the present invention.

The phrases "in use" or "in-use" are used herein to describe that condition of an item, e.g., a fuel, utilized in its usual and normal active state, e.g., releasing heat and light via combustion, or e.g., releasing heat via melting or being in a molten state. A candle is considered to be "in use" when the fuel of the candle is being utilized, e.g., a lit or burning candle is a candle in use. A candle is also considered to be "in use" when the fuel, e.g., wax, is in use, e.g., semi-solid, semi-soft, soft, or molten. For example, a candle set upon an active candle plate heater such that the wax is semi-solid, semi-soft, soft, or molten, is in use The term "layer" is art recognized, and is used herein to describe a defined region, thickness, or covering. This term is also used to differentiate between materials comprising the thermally protective materials of the invention. The term "first layer" or "interior layer" may comprise one or more single sheets of material joined together to form a single first or interior layer, e.g., a layer comprising an adhesive, e.g., an adhesive vinyl material comprising metal flecks. The term "exterior layer" may comprise one or more single sheets of material joined together to form a single exterior layer, e.g., an abrasion resistant layer or a UV-resistant layer, or a combination thereof. The term "central layer" may comprise one or more single sheets of material joined together to form a single central layer located between a first or interior layer and an exterior layer.

The term "liquid wax" is art recognized, and is used herein to describe a wax that is liquid at room temperature, e.g. jojoba wax.

The term "melting point" is art recognized, and is used herein to describe the temperature at which a solid material, e.g., solid wax, is converted to a liquid form, e.g., to melted, semi-soft, soft, or molten wax.

The term "molten" is art recognized, and is used herein to describe a wax that is in a flowable, liquid state. Typically, a wax enters a molten state as a result of exposure to a flame, e.g., a candle flame, and is very to dangerously hot to the touch.

The term "odorant" is art recognized, and is used herein to describe a chemical that imparts a fragrance to a space. Odorants include, but are not limited to, perfume oils, fragrance oils, aromatic oils, and essential oils, or combinations thereof.

The term "pool" is art recognized, and is used herein to describe the "pool" of molten, liquid wax which forms around a flame of a burning candle. An efficiently and evenly burning candle, e.g., a container candle, will eventually form a continuous pool of melted liquid wax, that is the wax pool is a layer of liquid wax resting evenly across and atop the solid, unburned wax of a candle, e.g., extending to all edges of the container housing a candle. The pool may be of any diameter and any shape, e.g., the diameter and shape of the container containing the candle.

The term "reflection" is art recognized, and is used herein to describe the change in direction of movement of a parameter, e.g., light, heat or sound. A parameter moving in one direction, striking a surface, and quickly moving in a different direction, e.g., the opposite direction, is said to have been reflected. For example, a TPM or a TPWL of the invention feature thermal reflection, i.e., each reflects heat. A given surface may reflect more than one parameter.

The phrase "safety-enhanced candle" is used herein to describe a candle providing an enhanced or improved safety profile as described herein.

The phrase "safety profile" is used herein to describe the feature and ability of an item, e.g., a cool-touch thermally-protected candle assembly (CTCA), to be safe to use. The phrase "increased safety profile" is used herein to describe the feature and ability of an item, e.g., a cool-touch thermally-protected candle assembly (CTCA), to be safer in use than a similar item e.g., a candle assembly that is not surrounded by a TPM or a TPWL of the invention. The safety profile, and thus the increased safety profile, of a candle, e.g. of the CTCA of the invention, may be measured and assessed by any number of parameters, including, but not limited to, reduction of: flame height, flame size, time required for pool formation, temperature of the outside of the container, temperature of the fuel when melted or molten, time required for the fuel to cool to room temperature and/or re-solidify, occurrence of wick slide, uneven burning of fuel, tunneling, occurrence of weight redistribution, shattering, cracking or other compromising of the integrity of the container housing the candle after exposure to heat, shattering, cracking or other compromising of the integrity of the container housing the candle upon contact with another item, e.g., when dropped onto a floor, or any combination thereof.

The terms "scented", "fragranced", or "perfumed" are art recognized, and are used interchangeably herein to describe the condition of an item, e.g., a fuel, to which an odorant has been added, e.g., a fragrance or essential oil. As used herein, a "scented", "fragranced" or "perfumed" candle refers to a candle assembly in which an odorant has been added to the fuel of the candle, e.g., a thermally-protected candle assembly of the invention in which the wax has been infused with a fragrance oil.

The term "shatter-resistant" is used herein to describe the feature or ability of a material, e.g., a TPM or a TPWL of the invention, to protect a fragile object, e.g., a candle in a glass container, from shattering or breaking. Shattering or breaking of a candle in a glass container may occur should the temperature of the wax contents and/or glass of the container become exceedingly hot so as to destroy the integrity of the glass container. Shattering or breaking of a candle in a glass container may also occur upon contact, for example, sharp and forceful contact, with another item, e.g., if dropped onto a floor.

The term "surround" is art recognized, and is used herein to describe the feature and ability of a material, e.g., a TPM or a TPWL of the invention, to fully extend around and encompass all or nearly all surfaces of another item, e.g., a round, square, or hexagonal glass or metal container, and to conform to the shape of the item, e.g., a round, square, hexagonal, or triangular glass or metal container. As such, the term "surround" includes placement of the material, e.g., a TPM or a TPWL of the invention, on the sides and a bottom and/or top surface of the other item.

The term "thermally assembled" is used herein to describe the use of high temperature and high pressure conditions to irreversibly fuse or join two or more layers of material, e.g., two or more layers of the same material, or e.g., two or more layers of different material, as described herein.

The term "thermally-protective" is used herein to refer to that condition or property of an item to decrease transmittal or passage of heat from one space to another space, that is, imparting some resistance to the movement of, and/or tolerance to, heat, e.g., the heat from a candle flame, or e.g., the heat from a molten wax fuel. In certain embodiments, a TPM or a TPWL of the invention is thermally-protective, that is, capable of protecting a consumer from a heat source, e.g., the hot exterior of a container candle in use, e.g., a flame, or e.g., the semi-solid, semi-soft, soft, or molten wax of a CTCA in use. Additionally, in certain embodiments, a TPM or a TPWL of the invention is capable of protecting a cool or cold item, e.g., a chilled can or bottle of a beverage, from warmth or heat, e.g., when being held and used by a consumer.

The term "throw" is art recognized, and is used herein to describe the dispersion of fragrance from a source into a surrounding area. "Cold throw" is used to describe the throw of fragrance from a scented candle in an unlit or unused form, e.g., a scented candle at room temperature. "Hot throw" is used to describe the throw of fragrance from a scented candle when the wick is ignited and the fuel is burning, e.g., when the scented candle wax is melting. Hot throw is also used to describe the throw of fragrance from semi-solid, semi-soft, soft, or molten scented wax, e.g., from a scented candle melted on a candle plate heater.

The term "translucent" is art recognized, and is used herein to describe the property of an item to scatter the transmittal or passage of light. When viewing an object through a translucent item, e.g., a translucent embodiment of the TPM or a TPWL of the invention, the object can be seen, but cannot be seen clearly. The view through a translucent material is also said to be hazy or clouded.

The term "transparent" is art recognized, and is used herein to describe the property of an item to transmit or allow passage of light without appreciable scattering. When viewing an object through a transparent item, e.g., clear UV-protective material, the object can be seen clearly.

The term "tunnel" is art recognized, and is used herein to describe the shape and condition of a burnt, or burning, solid wax candle that failed to form a continuous pool of melted wax evenly across and atop the unburned wax of the candle. In this condition, the wick resides in a well or cavern in the solid wax situated below the uppermost surface of the unburned wax. In this condition, the flame is unable to melt the wax to form a pool, thus decreasing the ability of the candle to burn safely and efficiently. A candle that does not burn evenly is prone to tunneling.

The term "wax" is art recognized, and is used herein to describe a wax fuel material that is solid or semi-solid at room temperature and that is able to be softened and/or melted upon exposure to high temperatures, e.g., when set upon a candle plate heater, or able to be ignited by and/or burned by a flame, e.g., a candle flame. The term wax is used herein to describe any and all types of wax such as petroleum based wax, e.g., paraffin, synthetic wax, e.g., ethylene-vinyl acetate copolymer wax, plant-based wax, e.g., soy, animal-based wax, e.g., whale oil, or any other natural wax, e.g., beeswax, or any combination thereof. The term wax is also used herein to describe any and all types of gel wax such as, but not limited to, all grades of VERSAGEL® candle gel wax. A wax may be used as a fuel material in a pure form, e.g., 100% pure soy wax, or waxes may be blended in any combination, e.g., 75% soy wax and 25% paraffin wax.

The term "wick slide" is art recognized, and is used herein to describe that condition when the wick of a candle becomes dislodged from the container to which it was attached and moves laterally within the fuel. Wick slide may result in the wick, and thus the flame, moving close to the wall of the container housing the candle fuel, decreasing burning efficiency and safety.

II. The Thermally-Protective Material (TPM) of the Invention

The present invention provides a multi-layered, thermally-protective material (TPM) which reflects and resists the absorption of heat, e.g., the material has an insulating effect. When encircling or surrounding an item, the TPM of the invention thermally protects the item, e.g., retains the heat of a hot item, or, e.g., retains the coolness of a cool item, by reflecting and diffusing heat. When in place surrounding a container candle, the TPM of the invention enhances the safety and experience profiles of the candle, protecting the consumer from typical safety hazards associated with a candle in use, while also enhancing enjoyment of the candle.

In one aspect, the present invention provides a multi-layered thermally-protective material (TPM) comprising at least one layer of vinyl material comprising metal flecks and at least one layer of a UV protective material, an abrasion resistant material, or a dual-property UV protective and abrasion resistant material, where the layers of material are thermally assembled to form the TPM. The vinyl material may be any vinyl material comprising metal flecks, flakes, or specks that is able to be irreversibly and thermally assembled with at least one layer of a UV protective material, an abrasion resistant material, or a dual-property UV protective and abrasion resistant material. The suitable vinyl material retains pre-thermal assembly properties such as flexibility, smoothness, adhesion, printability, integrity, and the like. The suitable UV protective material, abrasion resistant material, or dual-property UV protective and abrasion resistant material also retain pre-thermal assembly properties such as flexibility, smoothness, integrity, ability to provide UV and/or abrasion protection, and the like. The multi-layered thermally-protective material exhibits a post-thermally assembled property of providing thermal protection, e.g., increased thermal protection as compared to a single-layered or multi-layered vinyl material that was not subjected to thermal assembly. The multi-layered thermally-protective material may exhibit a post-thermally assembled appearance which is more attractive, e.g., taking on an ice-crystal, frosty look that is more reflective, glittery, and shimmery than the materials before thermal assembly.

In another embodiment, the present invention provides a multi-layered thermally-protective material (TPM) comprising at least one layer of adhesive vinyl material comprising metal flecks and at least one layer of a UV protective material, an abrasion resistant material, or a dual-property UV protective and abrasion resistant material, where the layers of material are thermally assembled to form the TPM. The vinyl material may be any adhesive vinyl material comprising metal flecks, flakes, or specks that is able to be irreversibly and thermally assembled with at least one layer of a UV protective material, an abrasion resistant material, or a dual-property UV protective and abrasion resistant material. In certain embodiments, the metal flecks, flakes, or specks are part of the vinyl material of the adhesive vinyl material. In certain embodiments, the metal flecks, flakes, or specks are part of the adhesive material of the adhesive vinyl material. In certain embodiments, the metal flecks, flakes, or specks are part of both the vinyl material and the adhesive material of the adhesive vinyl material. The suitable vinyl material retains pre-thermal assembly properties such as flexibility, smoothness, adhesion, printability, integrity, and the like. The suitable UV protective material, abrasion resistant material, or dual-property UV protective and abrasion resistant material also retain pre-thermal assembly properties such as flexibility, smoothness, integrity, ability to provide UV and/or abrasion protection, and the like. The multi-layered thermally-protective material exhibits a post-thermally assembled property of providing thermal protection, e.g., increased thermal protection as compared to a single-layered or multi-layered vinyl material that was not subjected to thermal assembly. The multi-layered thermally-protective material may exhibit a post-thermally assembled appearance which is more attractive, e.g., taking on an ice-crystal, frosty look that is more reflective, glittery, and shimmery than the materials before thermal assembly.

Suitable vinyl materials for use in practicing the invention include, but are not limited to, any form of polyvinyl chloride, e.g., an adhesive polyvinyl chloride, or e.g., a cast vinyl material, comprising metal flecks, flakes, or specks, that is able to be irreversibly thermally assembled to itself or with at least one layer of a UV protective material, an abrasion resistant material, or a dual-property UV protective and abrasion resistant material. The metal flecks, flakes, or specks may be part of the vinyl material, part of the adhesive material, or part of both the vinyl material and the adhesive material of the adhesive vinyl material. The suitable vinyl material, in addition to metal flecks, flakes, or specks, may further comprise one or more additives, such as, but not limited to plasticizers, heat stabilizers, fillers, processing aids, UV stabilizers, thermal modifiers, biocides, flame retardants, impact modifiers, blowing agents, smoke suppressors, pigments, or any combination thereof.

Vinyl material comprising metal flakes, flecks, or specks may be referred to as metallic or metallicized vinyl. Metallic or metallicized vinyl may be opaque or translucent in appearance. Translucent vinyl material comprising extremely small metal flecks, flakes, or specks, or translucent vinyl material that is textured to partially obscure the transmission of light, may be referred to as frosted vinyl. The metal flakes, flecks, or specs are small in size, e.g., 0.001 mm, e.g., 0.01 mm, e.g., 0.05 mm, e.g., 0.1 mm, e.g., 0.5 mm, e.g., 1 mm, e.g., 2 mm, e.g., 3 mm, e.g., 4 mm, e.g., 5 mm, or larger. In one embodiment, a plurality of metal flakes, flecks, or specs are distributed within a host material, e.g., vinyl material. In one embodiment, the plurality of metal flakes, flecks, or specs are distributed within an adhesive material, e.g., the adhesive layer of an adhesive vinyl material. In yet another embodiment, the plurality of metal flakes, flecks, or specs are distributed within more than one host material, e.g., within both the vinyl and the adhesive of an adhesive vinyl material. The materials comprising the metal flecks, flakes, or specs include, but are not limited to alkali metals, e.g., sodium or potassium, alkaline metals, e.g., magnesium or calcium, transition metals, e.g., titanium, nickel, copper, zinc, silver, or gold, post-transition metals, e.g., aluminum or lead, lanthanides, e.g., lanthanum, or actinides, e.g., actinium, or any suitable derivatives of, or any combination thereof. In one embodiment, the materials comprising the metal flecks, flakes, or specks include, but are not limited to transition metals, e.g., titanium, nickel, copper, zinc, silver, or gold, or post-transition metals, e.g., aluminum or lead, or any suitable derivatives of, or any combination thereof. In certain embodiments, the materials comprising the metal flecks, flakes, or specks include, but are not limited to, post-transition metals, e.g., aluminum or lead, or any suitable derivatives of, or any combination thereof. In particular embodiments, the materials comprising the metal flecks, flakes, or specks is aluminum or any suitable derivatives thereof. In a specific embodiment, the material comprising the metal flecks, flakes, or specks is aluminum.

Metallic and frosted vinyls may exhibit an altered feel and flexibility compared to vinyl lacking metal flakes, flecks, or specks. Some metallic and frosted vinyls exhibit a rough surface which reduces the ability of these vinyls to be printed upon; other metallic and frosted vinyls are smooth and readily accept one or more applications of ink. In one embodiment, the adhesive vinyl material comprising metal flecks is Frosted Ice Vinyl, a 3.4 mil translucent cast polyvinyl chloride comprising heat and light stabilizers, a unique combination of colored pigments, and flecks of aluminum in a permanent acrylic adhesive layer, which produces a sparkle effect when laminated onto or applied onto glass. In certain embodiments, the adhesive vinyl material comprising metal flecks, flakes, or specks, e.g., Frosted Ice Vinyl, is printable, that is, able to be printed upon.

Suitable adhesive materials are any adhesive materials which can undergo one or more exposures to thermal assembly conditions, and retain adhesive properties, allowing secure adhesion of the TPM of the invention to a surface, e.g., any or all surfaces of a container housing a container candle. Suitable adhesives include, but are not limited to acrylic, rubber, or elastomeric, and may be transfer, permanent, or removable. In one embodiment, the adhesive is permanent acrylic.

In one embodiment, the TPM of the invention that reflects and resists the absorption of heat comprises at least one layer of adhesive vinyl material comprising metal flecks, and at least one layer of a dual property UV-protective/abrasion resistant material (UV/AB), where the metal flecks are dispersed within the vinyl layer of the adhesive vinyl material. The UV/AB is applied over and atop the at least one layer of adhesive vinyl material comprising metal flecks. The UV/AB is any UV-protective/abrasion resistant material which can undergo one or more exposures to thermal assembly conditions and retain its UV-protective and abrasion-resistant properties. In certain embodiments, the UV/AB is transparent. In certain other embodiments, the UV/AB is translucent.

In one embodiment, the TPM of the invention that reflects and resists the absorption of heat comprises at least one layer of adhesive vinyl material comprising metal flecks, where the metal flecks are dispersed within the adhesive layer of the adhesive vinyl material, e.g., Frosted Ice Vinyl, and at least one layer of a dual property UV-protective/abrasion resistant material (UV/AB). The UV/AB is applied over and atop the at least one layer of adhesive vinyl material comprising metal flecks, e.g., Frosted Ice Vinyl. The UV/AB is any UV-protective/abrasion resistant material which can undergo one or more exposures to thermal assembly conditions and retain its UV-protective and abrasion-resistant properties. In certain embodiments, the UV/AB is transparent. In certain other embodiments, the UV/AB is translucent.

Suitable UV-protective/abrasion-resistant materials include, but are not limited to Abrasion Guard® SPF, Frogskin™, and the like. In one embodiment, the UV/AB material is Abrasion Guard® SPF (Sign Protection Formula), a clear, top-coat GerberColor Finishing Series Foil designed to protect graphics from moderate contact and exposure to harmful effects of UV rays. When applied as a protective overprint on other GerberColor Foils, Abrasion Guard SPF will extend the life of the base color by up to 30%. In one embodiment, the UV/AB material is Frogskin™, an ultra-thin, ultra-clear protective coating that is applied as a laminate. In certain embodiments, one layer of UV/AB material, e.g., Frogskin™, is utilized in the preparation of the TPM of the invention. In certain embodiments, two layers of UV/AB material, e.g., Frogskin™, are utilized in the preparation of the TPM of the invention. In certain embodiments, three or more layers of UV/AB material, e.g., Frogskin™, are utilized in the preparation of the TPM of the invention.

In one embodiment, the TPM of the invention that resists the absorption of heat comprises at least one layer of adhesive vinyl material comprising metal flecks, and at least one layer of UV-protective material, where the metal flecks are contained within the vinyl layer of the adhesive vinyl material. In another embodiment, the TPM of the invention that resists the absorption of heat comprises at least one layer of adhesive vinyl material comprising metal flecks, where the metal flecks are dispersed within the adhesive layer of the adhesive vinyl material, e.g., Frosted Ice Vinyl, and at least one layer of UV-protective material. The UV-protective material is applied over and atop the at least one layer of adhesive vinyl material comprising metal flecks. The UV-protective material is any UV-protective material which can undergo one or more exposures to thermal assembly conditions and retain its UV-protective properties. In certain embodiments, the UV-protective material is transparent. In certain embodiments, the UV-protective material is translucent.

In certain embodiments, the UV-protective material is Gerber UVGuard®, a 1-mil, clear, TEDLAR® polyvinyl fluoride (PVF) laminating film designed to further expand the resistance to weathering of printed graphics for up to five years. In certain other embodiments, the UV-protective material is Gerber UVGuard™ 9, a 2-mil, glossy, clear, mildew-resistant, polyvinyl fluoride laminating film with a petrochemical-resistant adhesive system. It is designed to expand the resistance to weathering of printed graphics up to nine years. In certain embodiments, one layer of UV-protective material is utilized in the preparation of the TPM of the invention. In certain embodiments, two or more layers of UV-protective material are utilized in the preparation of the TPM of the invention.

In one embodiment, the TPM of the invention that resists the absorption of heat comprises at least one layer of adhesive vinyl material comprising metal flecks, and at least one layer of abrasion-resistant material, where the metal flecks are contained within the vinyl layer of the adhesive vinyl material. In another embodiment, the TPM of the invention that resists the absorption of heat comprises at least one layer of adhesive vinyl material comprising metal flecks, where the metal flecks are dispersed within the adhesive layer of the adhesive vinyl material, e.g., Frosted Ice Vinyl, and at least one layer of abrasion-resistant material. The abrasion-resistant material is applied over and atop the at least one layer of adhesive vinyl material comprising metal flecks, e.g., Frosted Ice Vinyl. The abrasion-resistant material is any abrasion-resistant material which can undergo one or more exposures to thermal assembly conditions and retain its abrasion-resistant properties. In certain embodiments, the abrasion-resistant material is transparent. In certain embodiments, the abrasion-resistant material is translucent.

In certain embodiments, the abrasion resistant material is Gerber StrikeGuard™, an 8.0-mil, clear, glossy over-laminate film designed for a variety of applications. This heavy-duty over-laminate film is ideal for the protection of graphics, up to two years, and is especially beneficial where printed graphics experience severe handling and forceful impact. In certain embodiments, the abrasion resistant material is Matte Clear, a clear matte finish, top coat GerberColor Foil designed to reduce glare and protect graphics from moderate contact or handling. In certain embodiments, one layer of abrasion-resistant material is utilized in the preparation of the TPM of the invention. In certain embodiments, two or more layers of abrasion-resistant material are utilized in the preparation of the TPM of the invention.

In one embodiment, the adhesive vinyl material comprising metal flecks is translucent, e.g., Frosted Ice Vinyl, and the UV-protective material e.g., Gerber UVGuard®, the abrasion-resistant material, e.g., Gerber StrikeGuard™, or the UV/AB material, e.g., Abrasion Guard® SPF or Frogskin™, are optionally translucent. In certain embodiments, the adhesive vinyl material comprising metal flecks, e.g., Frosted Ice Vinyl, is translucent, and the UV-protective material e.g., Gerber UVGuard®, the abrasion-resistant material, e.g., Gerber StrikeGuard™, or the UV/AB material, e.g., Abrasion Guard® SPF or Frogskin™, are optionally transparent. In certain embodiments, the adhesive vinyl material comprising metal flecks, e.g., Frosted Ice Vinyl, is translucent, and the UV-protective material e.g., Gerber UVGuard®, the abrasion-resistant material, e.g., Gerber StrikeGuard™, or the UV/AB material, e.g., Abrasion Guard® SPF or Frogskin™, are transparent, such that the multi-layered TPM of the invention as a whole is essentially translucent in appearance, allowing visual observation and enjoyment of the contents of a container, e.g., a candle housed in a glass container. In each of the listed embodiments, the translucent adhesive vinyl material comprising metal flecks, e.g., Frosted Ice Vinyl, is optionally printed upon.

In one embodiment, the translucent adhesive vinyl material comprising metal flecks, e.g., Frosted Ice Vinyl, is thermally-printed upon with one or more applications of translucent foil ink, one or more applications of opaque foil ink, or any combination thereof. The thermally-applied foil ink is fused onto the translucent adhesive vinyl material comprising metal flecks; one color is applied per each application process. Suitable thermally-applied foil inks include any thermally-applied foil inks which can undergo one or more exposures to the conditions of a thermal printer and one or more exposures to thermal assembly conditions.

Suitable transparent thermally-applied foil inks include, but are not limited to, the GerberColor™ Transparent Series ink.

Suitable opaque thermally-applied foil inks include, but are not limited to, the GerberColor FX Foils Spot Series ink. In one embodiment, the opaque thermally-applied foil ink is GerberColor FX Foils Process Series. In another embodiment, the opaque thermally-applied foil ink is GerberColor FX Foils Special Effects ink. In one embodiment, the opaque thermally-applied foil ink is GerberColor FX Foils Invisible Ink. Any combination of any thermally-applied foil inks may be used to print upon the vinyl material of the TPM.

In one embodiment, the thermally protective material (TPM) of the invention comprises at least one layer of thermally-printed upon, adhesive vinyl material comprising metal flecks and at least one layer of UV-protective/abrasion resistant material (UV/AB). In certain embodiments, the thermally-printed upon, adhesive vinyl material comprising metal flecks is Frosted Ice Vinyl. In certain embodiments, the TPM of the invention that resists the absorption of heat comprises at least one layer of adhesive vinyl material comprising metal flecks, e.g., Frosted Ice Vinyl, and at least one layer of abrasion-resistant material, where the metal flecks are contained within the adhesive layer of the adhesive vinyl material, and the UV/AB material is Abrasion Guard® SPF or Frogskin™. In certain embodiments, the thermally-printed upon, adhesive vinyl material comprising metal flecks is Frosted Ice Vinyl and the UV/AB material is Frogskin™.

In yet another embodiment, the TPM of the invention that resists the absorption of heat is translucent, comprising translucent Frosted Ice Vinyl material and transparent UV/AB material, e.g., Frogskin™. In certain embodiments, the Frosted Ice Vinyl material of the TPM of the invention is thermally printed upon. In particular embodiments, the Frosted Ice Vinyl material of the TPM is thermally printed upon with translucent foil ink. In a specific embodiment, the Frosted Ice Vinyl material of the TPM is thermally printed upon with one, two, three, or more applications, e.g., colors, of translucent foil ink. In an alternative specific embodiment, the vinyl material of the TPM is thermally printed upon with three applications, e.g., three different colors, of translucent foil ink.

In yet another embodiment, the TPM of the invention that resists the absorption of heat is translucent, comprising a first layer of translucent Frosted Ice Vinyl material and at least one outer layer of transparent UV/AB material, e.g., Frogskin™. In certain embodiments, the Frosted Ice Vinyl material of the TPM of the invention is thermally printed upon. In particular embodiments, the Frosted Ice Vinyl material of the TPM is thermally printed upon with translucent foil ink. In a specific embodiment, the Frosted Ice Vinyl material of the TPM is thermally printed upon with one, two, three, or more applications, e.g., colors, of translucent foil ink. In an alternative specific embodiment, the vinyl material of the TPM is thermally printed upon with three applications, e.g., three different colors, of translucent foil ink.

In yet another embodiment, the TPM of the invention that resists the absorption of heat is translucent, comprising a first layer of translucent Frosted Ice Vinyl material and one outer layer of Frogskin™. In certain embodiments, the Frosted Ice Vinyl material of the TPM of the invention is thermally printed upon. In particular embodiments, the Frosted Ice Vinyl material of the TPM is thermally printed upon with translucent foil ink. In a specific embodiment, the Frosted Ice Vinyl material of the TPM is thermally printed upon with one, two, three, or more applications, e.g., colors, of translucent foil ink. In an alternative specific embodiment, the vinyl material of the TPM is thermally printed upon with three applications, e.g., three different colors, of translucent foil ink.

III. The Cool-Touch Thermally-Protective Candle Wrap or Label (TPWL) of the Invention The thermally-protective vinyl materials of the invention, when encircling or surrounding the container of any container candle, e.g., a soy wax container candle, improve the safety profile of, and thus protect, the consumer from typical safety hazards associated with a candle in use. When in place surrounding any container candle, e.g., a soy or paraffin wax container candle, the TPM of the invention transforms any candle, e.g., a container candle, or e.g., a soy wax container candle, or e.g., a paraffin wax container candle, into a cool-touch thermally-protected candle assembly.

As such, in one aspect, the present invention provides a cool-touch, thermally protective candle wrap or label (TPWL) that reflects and resists the absorption of heat prepared from a thermally-protective vinyl material (TPM) according to any embodiment of the invention described herein. In one embodiment, the TPWL is prepared from the TPM of the invention, comprising at least one layer of thermally-printed upon, adhesive vinyl material comprising metal flecks and at least one layer of UV-protective/abrasion resistant material (UV/AB). In certain embodiments, the thermally-printed upon, adhesive vinyl material comprising metal flecks is metallicized or frosted, e.g., Frosted Ice Vinyl, and the UV/AB material is Abrasion Guard® SPF or Frogskin™. In particular embodiments, the thermally-printed upon, adhesive vinyl material comprising metal flecks is Frosted Ice Vinyl, and the UV/AB material is Abrasion Guard® SPF. In a specific embodiment, the thermally-printed upon, adhesive vinyl material comprising metal flecks is Frosted Ice Vinyl and the UV/AB material is Frogskin™.

In yet another embodiment, the TPWL that reflects and resists the absorption of heat prepared from the TPM of the invention is translucent, comprising translucent Frosted Ice Vinyl material and transparent UV/AB material, e.g., Abrasion Guard® SPF or Frogskin™. In certain embodiments, the Frosted Ice Vinyl material of the TPM is thermally printed upon. In particular embodiments, the Frosted Ice Vinyl material of the TPM is thermally printed upon with translucent foil ink. In a specific embodiment, the Frosted Ice Vinyl material of the TPM is thermally printed upon with one, two, three, or more applications, e.g., colors, of translucent foil ink. In an alternative specific embodiment, the vinyl material of the TPM is thermally printed upon with three applications, e.g., three different colors, of translucent foil ink.

In yet another embodiment, the TPWL that reflects and resists the absorption of heat prepared from the TPM of the invention is translucent, comprising a first layer of translucent Frosted Ice Vinyl material and at least one outer layer of transparent UV/AB material, e.g., Frogskin™. In certain embodiments, the Frosted Ice Vinyl material of the TPM of the invention is thermally printed upon. In particular embodiments, the Frosted Ice Vinyl material of the TPM is thermally printed upon with translucent foil ink. In a specific embodiment, the Frosted Ice Vinyl material of the TPM is thermally printed upon with one, two, three, or more applications, e.g., colors, of translucent foil ink. In an alternative specific embodiment, the vinyl material of the TPM is thermally printed upon with three applications, e.g., three different colors, of translucent foil ink.

In yet another embodiment, the TPWL that resists the absorption of heat prepared from the TPM of the invention is translucent, comprising a first layer of translucent Frosted Ice Vinyl material, optionally thermally-printed upon, and one outer layer of transparent Frogskin™ (this combination is referred to hereinafter as the "FIV label"). In certain embodiments, the Frosted Ice Vinyl material of the TPM of the invention is thermally printed upon. In particular embodiments, the Frosted Ice Vinyl material of the TPM is thermally printed upon with translucent foil ink. In a specific embodiment, the Frosted Ice Vinyl material of the TPM is thermally printed upon with one, two, three, or more applications, e.g., colors, of translucent foil ink. In an alternative specific embodiment, the vinyl material of the TPM is thermally printed upon with three applications, e.g., three different colors, of translucent foil ink.

Exterior Temperature

In one embodiment, the invention provides a translucent TPWL, optionally thermally-printed upon, which reflects and resists the absorption of heat, prepared from a TPM of the invention, where, when said wrap securely encircles or surrounds a pure soy wax candle, the maximum exterior temperature reached by the wrapped candle in use does not exceed about 170° F., e.g., about 165° F., e.g., about 160° F., e.g., about 155° F., e.g., about 150° F., e.g., about 149° F., e.g., about 148° F., e.g., about 147° F., e.g., about 146° F., e.g., about 145° F., e.g., about 144° F., e.g., about 143° F., e.g., about 142° F., e.g., about 141° F., e.g., about 140° F., e.g., about 139° F., e.g., about 138° F., e.g., about 137° F., e.g., about 136° F., e.g., about 135° F., e.g., about 134° F., e.g., about 133° F., e.g., about 132° F., e.g., about 131° F., e.g., about 130° F., or less.

In another embodiment, the invention provides a translucent TPWL that resists the absorption of heat prepared from the TPM of the invention, comprising one layer of unprinted adhesive vinyl material comprising metal flecks, e.g., Frosted Ice Vinyl, and one layer of UV/AB material, e.g., Frogskin™, e.g., an FIV label, where, when said wrap securely encircles or surrounds a candle, e.g., a 9 ounce pure soy wax candle, or e.g., a 16 ounce pure soy wax candle, the maximum in-use exterior temperature reached by the wrapped candle does not exceed about 170° F., e.g., about 165° F., e.g., about 160° F., e.g., about 155° F., e.g., about 150° F., e.g., about 149° F., e.g., about 148° F., e.g., or less.

In certain embodiments, the invention provides a translucent TPWL, e.g., an FIV label, where, when said wrap securely encircles or surrounds a candle, e.g., a 9 ounce pure soy wax candle, the maximum in-use exterior temperature reached by the wrapped candle does not exceed about 170° F., e.g., about 165° F., e.g., about 160° F., e.g., about 155° F., e.g., about 150° F., e.g., about 149° F., e.g., about 148° F., e.g., about 147° F., e.g., about 146° F., e.g., about 145° F., e.g., about 144° F., e.g., about 143° F., e.g., about 142° F., e.g., about 141° F., e.g., about 140° F., e.g., about 139° F., e.g., about 138° F., e.g., about 137° F., e.g., about 136° F., e.g., about 135° F., e.g., about 134° F., e.g., about 133° F., e.g., about 132° F., e.g., about 131° F., e.g., about 130° F., or less.

In certain embodiments, the invention provides a translucent TPWL, e.g., an FIV label, where, when said wrap securely encircles or surrounds a candle, e.g., a 16 ounce pure soy wax candle, the maximum in-use exterior temperature reached by the wrapped candle does not exceed about 160° F., e.g., about 155° F., e.g., about 150° F., e.g., about 149° F., e.g., about 148° F., e.g., about 147° F., e.g., about 146° F., e.g., about 145° F., e.g., about 144° F., e.g., about 143° F., e.g., about 142° F., e.g., about 141° F., e.g., about 140° F., e.g., about 139° F., e.g., about 138° F., e.g., about 137° F., e.g., about 136° F., e.g., about 135° F., e.g., about 134° F., e.g., about 133° F., e.g., about 132° F., e.g., about 131° F., e.g., about 130° F., or less.

In another embodiment, the translucent TPWL, e.g., an FIV label, decreases the maximum in-use exterior temperature reached by the wrapped candle, e.g., a 9 ounce pure soy wax candle, or e.g., a 16 ounce pure soy wax candle, by at least about 2%, e.g., at least about 3%, e.g., at least about 4%, e.g., at least about 5%, e.g., at least about 6%, e.g., at least about 6%, e.g., at least about 7%, e.g., at least about 8%, e.g., at least about 9%, e.g., at least about 10%, e.g., at least about 11%, e.g., at least about 12%, e.g., at least about 13%, e.g., at least about 14%, e.g., at least about 15%, e.g., at least about 16%, e.g., at least about 17%, e.g., at least about 18%, e.g., at least about 19%, e.g., at least about 20%, or more, compared to an identical candle lacking a TPWL.

In one embodiment, the invention provides a translucent TPWL, e.g., an FIV label, where, when said wrap securely encircles or surrounds a candle, e.g., a 7 ounce paraffin wax candle, or e.g., a 22 ounce paraffin wax candle, or e.g., a 22 ounce two-wick paraffin wax candle, the maximum in-use exterior temperature reached by the wrapped candle does not exceed about 185° F., e.g., about 180° F., e.g., about 175° F., e.g., about 170° F., e.g., about 165° F., e.g., about 160° F., e.g., about 155° F., e.g., about 150° F., e.g., about 145° F., e.g., about 140° F., e.g., about 139° F., e.g., about 138° F., e.g., about 137° F., e.g., about 136° F., e.g., about 135° F., e.g., about 134° F., or less.

In certain embodiments, the invention provides a translucent TPWL, e.g., an FIV label, where, when said wrap securely encircles or surrounds a candle, e.g., a 7 ounce paraffin wax candle, the maximum exterior temperature reached by the wrapped candle does not exceed about 155° F., e.g., about 150° F., e.g., about 145° F., e.g., about 140° F., e.g., about 139° F., e.g., about 138° F., e.g., about 137° F., e.g., about 136° F., e.g., about 135° F., e.g., about 134° F., or less.

In certain embodiments, the translucent TPWL, e.g., an FIV label, decreases the maximum in-use exterior temperature reached by the wrapped candle, e.g., a 7 ounce paraffin wax candle, by at least about 4%, e.g., at least about 5%, e.g., at least about 6%, e.g., at least about 6%, e.g., at least about 7%, e.g., at least about 8%, e.g., at least about 9%, e.g., at least about 10%, e.g., at least about 11%, e.g., at least about 12%, e.g., at least about 13%, e.g., at least about 14%, e.g., at least about 15%, or more, compared to an identical candle lacking a TPWL.

In certain embodiments, the invention provides a translucent TPWL, e.g., an FIV label, where, when said wrap securely encircles or surrounds a candle, e.g., a 22 ounce paraffin wax candle, the maximum exterior temperature reached by the wrapped candle does not exceed about 145° F., e.g., about 140° F., e.g., about 139° F., e.g., about 138° F., e.g., about 137° F., e.g., about 136° F., e.g., about 135° F., e.g., about 134° F., or less.

In certain embodiments, the translucent TPWL, e.g., an FIV label, decreases the maximum in-use exterior temperature reached by a candle, e.g., a 22 ounce paraffin wax candle, by at least about 2%, e.g., at least about 3%, e.g., at least about 4%, e.g., at least about 5%, e.g., at least about 6%, e.g., at least about 7%, e.g., at least about 8%, or more, compared to an identical candle lacking a TPWL.

In one embodiment, the invention provides a translucent TPWL, e.g., an FIV label, where, when said wrap securely encircles or surrounds a candle, e.g., a 22 ounce two-wick paraffin wax candle, the maximum in-use exterior temperature reached by the wrapped candle does not exceed about 185° F., e.g., about 180° F., e.g., about 177° F., e.g., about 175° F., e.g., about 170° F., e.g., about 165° F., e.g., about 160° F., e.g., about 155° F., e.g., about 150° F., e.g., about 145° F., e.g., about 140° F., e.g., about 139° F., e.g., about 138° F., e.g., about 137° F., e.g., about 136° F., e.g., about 135° F., e.g., about 134° F., or less.

In certain embodiments, the translucent TPWL, e.g., an FIV label, decreases the maximum in-use exterior temperature reached by a candle, e.g., a 22 ounce two-wick paraffin wax candle, by at least about 2%, e.g., at least about 3%, e.g., at least about 4%, e.g., at least about 5%, or more, compared to an identical candle lacking a TPWL.

Wax Temperature

In one embodiment, the invention provides a translucent cool-touch, thermally protective candle wrap or label (TPWL), optionally thermally-printed upon, which resists the absorption of heat prepared from the thermally-protective material (TPM) of the invention, where, when said wrap securely encircles or surrounds a pure soy wax candle, the maximum molten wax temperature reached by the wrapped candle in use does not exceed about 185° F., e.g., about 180° F., e.g., about 175° F., e.g., about 174° F., e.g., about 173° F., e.g., about 172° F., e.g., about 171° F., e.g., about 170° F., e.g., about 169° F., e.g., about 168° F., e.g., about 167° F., e.g., about 166° F., e.g., about 165° F., e.g., about 164° F., e.g., about 163° F., e.g., about 162° F., e.g., about 161° F., e.g., about 160° F., e.g., about 159° F., e.g., about 158° F., e.g., about 157° F., e.g., about 156° F., e.g., about 155° F., e.g., about 154° F., e.g., about 153° F., e.g., about 152° F., e.g., about 151° F., e.g., about 150° F., or less.

In another embodiment, the invention provides a translucent TPWL, e.g., an FIV label, where, when said wrap securely encircles or surrounds a candle, e.g., a 9 ounce pure soy wax candle, or e.g., a 16 ounce pure soy wax candle, the maximum in-use molten wax temperature reached by the wrapped candle does not exceed about 185° F., e.g., about 180° F., e.g., about 175° F., e.g., about 174° F., e.g., about 173° F., e.g., about 172° F., e.g., about 171° F., e.g., about 170° F., e.g., about 169° F., e.g., about 168° F., e.g., about 167° F., e.g., about 166° F., e.g., about 165° F., e.g., about 164° F., e.g., about 163° F., e.g., about 162° F., e.g., about 161° F., e.g., about 160° F., or less.

In yet another embodiment, the invention provides a translucent TPWL, e.g., an FIV label, where, when the wrap securely encircles or surrounds a candle, e.g., a 9 ounce pure soy wax candle, or e.g., a 16 ounce pure soy wax candle, the maximum in-use molten wax temperature reached by the wrapped candle does not exceed about 185° F., e.g., about 180° F., e.g., about 175° F., e.g., about 174° F., e.g., about 173° F., e.g., about 172° F., e.g., about 171° F., e.g., about 170° F., e.g., about 169° F., e.g., about 168° F., e.g., about 167° F., e.g., about 166° F., e.g., about 165° F., e.g., about 164° F., e.g., about 163° F., e.g., about 162° F., e.g., about 161° F., e.g., about 160° F., e.g., about 159° F., e.g., about 158° F., e.g., about 157° F., e.g., about 156° F., e.g., about 155° F., e.g., about 154° F., e.g., about 153° F., e.g., about 152° F., e.g., about 151° F., e.g., about 150° F., or less.

In certain embodiments, the translucent TPWL, e.g., an FIV label, decreases the maximum in-use molten wax temperature reached by a candle, e.g., a 9 ounce pure soy wax candle, by at least about 2%, e.g., at least about 3%, e.g., at least about 4%, e.g., at least about 5%, e.g., at least about 6%, e.g., at least about 6%, e.g., at least about 7%, e.g., at least about 8%, e.g., at least about 9%, e.g., at least about 10%, e.g., at least about 11%, e.g., at least about 12%, e.g., at least about 13%, e.g., at least about 14%, e.g., at least about 15%, e.g., at least about 16%, e.g., at least about 17%, e.g., at least about 18%, or more, compared to an identical candle lacking the TPWL.

In certain embodiments, the translucent TPWL, e.g., an FIV label, decreases the maximum in-use molten wax temperature reached by a candle, e.g., a 16 ounce pure soy wax candle, by at least about 2%, e.g., at least about 3%, e.g., at least about 4%, e.g., at least about 5%, e.g., at least about 6%, e.g., at least about 6%, e.g., at least about 7%, or more, compared to an identical candle lacking the TPWL.

In one embodiment, the invention provides a translucent TPWL, e.g., an FIV label, where, when the wrap securely encircles or surrounds a candle, e.g., a 7 ounce paraffin wax candle, or e.g., a 22 ounce two-wick paraffin wax candle, the maximum in-use molten wax temperature reached by the wrapped candle does not exceed about 208° F., e.g., about 205° F., e.g., about 200° F., e.g., about 195° F., e.g., about 190° F., e.g., about 185° F., e.g., about 180° F., e.g., about 175° F., e.g., about 170° F., e.g., about 165° F., e.g., about 160° F., e.g., about 155° F., e.g., about 154° F., e.g., about 153° F., e.g., about 152° F., e.g., about 151° F., or less.

In certain embodiments, the invention provides a translucent TPWL, e.g., an FIV label, where, when the wrap securely encircles or surrounds a candle, e.g., a 7 ounce paraffin wax candle, the maximum in-use molten wax temperature reached by the wrapped candle does not exceed about 170° F., e.g., about 165° F., e.g., about 160° F., e.g., about 155° F., e.g., about 154° F., e.g., about 153° F., e.g., about 152° F., e.g., about 151° F., or less.

In certain embodiments, the translucent TPWL, e.g., an FIV label, decreases the maximum in-use molten wax temperature reached by a candle, e.g., a 7 ounce paraffin wax candle, by at least about 4%, e.g., at least about 5%, e.g., at least about 6%, e.g., at least about 6%, e.g., at least about 7%, e.g., at least about 8%, e.g., at least about 9%, e.g., at least about 10%, e.g., at least about 11%, or more, compared to an identical candle lacking a TPWL.

In certain embodiments, the invention provides a translucent TPWL, e.g., an FIV label, where, when said wrap securely encircles or surrounds a candle, e.g., a 22 ounce two-wick paraffin wax candle, the maximum in-use molten wax temperature of said wrapped candle does not exceed about 208° F., e.g., about 205° F., e.g., about 200° F., or less.

In certain embodiments, the translucent TPWL, e.g., an FIV label, decreases the maximum in-use exterior temperature reached by a candle, e.g., a 22 ounce two-wick paraffin wax candle, by at least about 2%, e.g., at least about 3%, e.g., at least about 4%, e.g., or more, compared to an identical candle lacking a TPWL.

Burn Time

In one embodiment, the invention provides a translucent TPWL, optionally thermally-printed upon, which reflects and resists the absorption of heat prepared from the TPM of the invention, where, when said wrap securely encircles or surrounds a pure soy wax candle, the burn time of said wrapped candle in use may exceed about 50 hours, e.g., about 55 hours, e.g., about 60 hours, e.g., about 65 hours, e.g., about 70 hours, e.g., about 75 hours, e.g., about 80 hours, e.g., about 85 hours, e.g., about 90 hours, e.g., about 95 hours, e.g., about 100 hours, or more.

In another embodiment, the invention provides a translucent TPWL that resists the absorption of heat prepared from the TPM of the invention, comprising one layer of unprinted adhesive vinyl material comprising metal flecks, e.g., Frosted Ice Vinyl, and one layer of UV/AB material, e.g., Frogskin™, e.g., an FIV label, where, when said wrap securely encircles or surrounds a candle, e.g., a 9 ounce pure soy wax candle, the burn time of said wrapped candle in use may exceed about 50 hours, e.g., about 55 hours, or more.

In yet another embodiment, the invention provides a translucent TPWL, e.g., an FIV label, where, when said wrap securely encircles or surrounds a candle, e.g., a 16 ounce pure soy wax candle, the burn time of said wrapped candle in use may exceed about 50 hours, e.g., about 55 hours, e.g., about 60 hours, e.g., about 65 hours, e.g., about 70 hours, e.g., about 75 hours, e.g., about 80 hours, or more.

In certain embodiments, the invention provides a translucent TPWL, e.g., an FIV label, where, when said wrap securely encircles or surrounds a candle, e.g., a 9 ounce pure soy wax candle, the burn time of said wrapped candle may exceed about 50 hours, e.g., about 55 hours, e.g., about 60 hours, or more.

In certain embodiments, the invention provides a translucent TPWL, e.g., an FIV label, where, when said wrap securely encircles or surrounds a candle, e.g., a 16 ounce pure soy wax candle, the burn time of the wrapped candle may exceed about 50 hours, e.g., about 55 hours, e.g., about 60 hours, e.g., about 65 hours, e.g., about 70 hours, e.g., about 75 hours, e.g., about 80 hours, e.g., about 85 hours, e.g., about 90 hours, e.g., about 95 hours, e.g., about 100 hours, or more.

In certain embodiments, the translucent TPWL, e.g., an FIV label, increases the burn time of a candle, e.g., a 9 ounce pure soy wax candle, by at least about 2%, e.g., at least about 3%, e.g., at least about 4%, e.g., at least about 5%, e.g., at least about 6%, e.g., at least about 7%, e.g., at least about 8%, e.g., at least about 9%, e.g., at least about 10%, e.g., at least about 11%, e.g., at least about 12%, e.g., at least about 13%, e.g., at least about 14%, e.g., at least about 15%, e.g., at least about 16%, e.g., at least about 17%, or more, compared to an identical candle lacking the TPWL.

In certain embodiments, the translucent TPWL, e.g., an FIV label, increases the burn time of a candle, e.g., a 16 ounce pure soy wax candle, by at least about 5%, e.g., at least about 10%, e.g., at least about 15%, e.g., at least about 20%, e.g., at least about 25%, e.g., at least about 26%, e.g., at least about 27%, e.g., at least about 28%, e.g., at least about 29%, e.g., at least about 30%, e.g., at least about 31% or more, compared to an identical candle lacking the TPWL.

In another embodiment, the invention provides a translucent TPWL, e.g., an FIV label, where when said wrap securely encircles or surrounds a candle, e.g., a 7 ounce paraffin wax candle, or e.g., a 22 ounce two-wick paraffin wax candle, the burn time of the wrapped candle may exceed about 45 hours, e.g., about 50 hours, e.g., about 55 hours, e.g., about 60 hours, e.g., about 65 hours, e.g., about 70 hours, e.g., about 75 hours, e.g., about 80 hours, e.g., about 85 hours, e.g., about 90 hours, e.g., about 95 hours, e.g., about 100 hours, e.g., about 105 hours, or more.

In certain embodiments, the invention provides a translucent TPWL, e.g., an FIV label, where, when the wrap securely encircles or surrounds a candle, e.g., a 7 ounce paraffin wax candle, the burn time of the wrapped candle may exceed about 45 hours, e.g., about 50 hours, e.g., about 55 hours, or more.

In certain embodiments, the translucent TPWL, e.g., an FIV label, increases the burn time of a candle, e.g., a 7 ounce paraffin wax candle, by at least about 2%, e.g., at least about 3%, e.g., at least about 4%, e.g., at least about 5%, e.g., at least about 6%, e.g., at least about 7%, e.g., at least about 8%, e.g., at least about 9%, e.g., at least about 10%, e.g., at least about 11%, e.g., at least about 12%, e.g., at least about 13%, e.g., at least about 14%, e.g., at least about 15%, e.g., at least about 16%, e.g., at least about 17%, e.g., at least about 18%, e.g., at least about 19%, or more, compared to an identical candle lacking the TPWL.

In certain embodiments, the invention provides a translucent TPWL, e.g., an FIV label, where, when the wrap securely encircles or surrounds a candle, e.g., a 22 ounce two-wick paraffin wax candle, the burn time of the wrapped candle may exceed about 70 hours, e.g., about 71 hours, e.g., about 72 hours, e.g., about 73 hours, e.g., about 74 hours, e.g., about 75 hours, or more.

In certain embodiments, the translucent TPWL, e.g., an FIV label, increases the burn time of a candle, e.g., a 22 ounce two-wick paraffin wax candle, by at least about 2%, e.g., at least about 3%, e.g., at least about 4%, e.g., at least about 5%, e.g., at least about 6%, e.g., at least about 7%, or more, compared to an identical candle lacking the TPWL.

IV. The Cool-Touch Thermally-Protected Candle Assembly (CTCA) of the Invention

The present invention relates to a cool-touch thermally-protected candle assembly (CTCA) exhibiting enhanced safety and experience profiles. The cool-touch thermally protected candle (CTCA) reaches a decreased maximum external temperature and decreased maximum molten fuel temperature compared to an identical candle lacking the thermally-protective wrap or label (TPWL) described herein. The cool-touch thermally-protected candle assembly (CTCA) exhibits increased candle burn time, increased hot throw, and/or decreased tunneling while the candle is in use.

As such, the present invention provides a cool-touch thermally-protected candle assembly (CTCA) comprising a container, a fuel, and at least one wick, and where the container is encircled or surrounded by the thermally-protective material (TPM) of the invention that resists the absorption of heat or a thermally-protective candle wrap or candle label (TPWL) prepared therefrom, e.g., an FIV label.

Containers

The candle container suitable for making the CTCA of the present invention is made of any type of material that is sturdy, can withstand temperatures of 100° F. or more, does not absorb or leak the contents of the candle assembly, and accepts the TPM or a TPWL of the invention, e.g., an FIV label. Exemplary candle container materials include, but are not limited to, metal, glass, heat resistant glass, certain plastics, and the like. In one embodiment, the candle container is of metal or glass. In certain embodiments, the candle container is of heat resistant glass. The candle container may or may not have a lid or closure.

The candle container used to prepare the CTCA of the present invention may be of any shape or size suitable to contain the contents of the candle assembly at room temperature and in use, and able to be encircled or surrounded the TPM or a TPWL, e.g., an FIV label, of the invention. The container is able to contain the fuel when the fuel is unlit, e.g., a solid or liquid wax, e.g., a liquid oil, and when the fuel is in use, e.g., combusted or, if solid, is semi-solid, semi-soft, soft, or molten via combustion, or upon exposure to a candle heating plate.

In one embodiment, the shape of the container is cylindrical, oval, triangular, square, rectangular, rhomboid, hexagonal, heptagonal, octagonal, and the like. In certain embodiments, the container is cylindrical, square or hexagonal. In particular embodiments, the container is cylindrical. In a specific embodiment, the container is cylindrical and made of glass. In an alternative specific embodiment, the container is cylindrical and made of heat resistant glass. In an alternative specific embodiment, the container is cylindrical, made of heat resistant glass and is associated with a closure, e.g., a twist on metal lid.

Cylindrical candle containers may further vary in shape. In one embodiment, the opening of the cylindrical container is the same diameter as that portion of the cylindrical container forming the sides of the container. In another embodiment, the opening of the cylindrical container is of a smaller diameter as that portion of the cylindrical container forming the sides of the container. In yet another embodiment, the opening of the cylindrical container is of a larger diameter as that portion of the cylindrical container forming the sides of the container.

The size of a candle container, and thus the amount, e.g., ounces, of fuel held in the container may also vary. In one embodiment, the candle container may vary in size to hold about 1 ounce to about 30 ounces of fuel, e.g., about 1 ounce, e.g., about 2 ounces, e.g., about 3 ounces, e.g., about 4 ounces, e.g., about 5 ounces, e.g., about 6 ounces, e.g., about 7 ounces, e.g., about 8 ounces, e.g., about 9 ounces, e.g., about 10 ounces, e.g., about 11 ounces, e.g., about 12 ounces, e.g., about 13 ounces, e.g., about 14 ounces, e.g., about 15 ounces, e.g., about 16 ounces, e.g., about 17 ounces, e.g., about 18 ounces, e.g., about 19 ounces, e.g., about 20 ounces, e.g., about 21 ounces, e.g., about 22 ounces, e.g., about 23 ounces, e.g., about 24 ounces, e.g., about 25 ounces, e.g., about 26 ounces, e.g., about 27 ounces, e.g., about 28 ounces, e.g., about 29 ounces, e.g., to about 30 ounces of fuel or more. In certain embodiments, the candle container may vary in size to hold about 2 ounces to about 30 ounces of fuel, e.g., about 2 ounces, e.g., about 3 ounces, e.g., about 4 ounces, e.g., about 5 ounces, e.g., about 6 ounces, e.g., about 7 ounces, e.g., about 8 ounces, e.g., about 9 ounces, e.g., about 10 ounces, e.g., about 11 ounces, e.g., about 12 ounces, e.g., about 13 ounces, e.g., about 14 ounces, e.g., about 15 ounces, e.g., about 16 ounces, e.g., about 17 ounces, e.g., about 18 ounces, e.g., about 19 ounces, e.g., about 20 ounces, e.g., about 21 ounces, e.g., about 22 ounces, e.g., about 23 ounces, e.g., about 24 ounces, e.g., about 25 ounces, e.g., about 26 ounces, e.g., about 27 ounces, e.g., about 28 ounces, e.g., about 29 ounces, e.g., to about 30 ounces of fuel or more. In certain embodiments, the candle container may vary in size to hold about 3 ounces to about 30 ounces of fuel, e.g., about 3 ounces, e.g., about 4 ounces, e.g., about 5 ounces, e.g., about 6 ounces, e.g., about 7 ounces, e.g., about 8 ounces, e.g., about 9 ounces, e.g., about 10 ounces, e.g., about 11 ounces, e.g., about 12 ounces, e.g., about 13 ounces, e.g., about 14 ounces, e.g., about 15 ounces, e.g., about 16 ounces, e.g., about 17 ounces, e.g., about 18 ounces, e.g., about 19 ounces, e.g., about 20 ounces, e.g., about 21 ounces, e.g., about 22 ounces, e.g., about 23 ounces, e.g., about 24 ounces, e.g., about 25 ounces, e.g., about 26 ounces, e.g., about 27 ounces, e.g., about 28 ounces, e.g., about 29 ounces, e.g., to about 30 ounces of fuel or more. In certain embodiments, the candle container may vary in size to hold about 4 ounces to about 30 ounces of fuel, e.g., about 4 ounces, e.g., about 5 ounces, e.g., about 6 ounces, e.g., about 7 ounces, e.g., about 8 ounces, e.g., about 9 ounces, e.g., about 10 ounces, e.g., about 11 ounces, e.g., about 12 ounces, e.g., about 13 ounces, e.g., about 14 ounces, e.g., about 15 ounces, e.g., about 16 ounces, e.g., about 17 ounces, e.g., about 18 ounces, e.g., about 19 ounces, e.g., about 20 ounces, e.g., about 21 ounces, e.g., about 22 ounces, e.g., about 23 ounces, e.g., about 24 ounces, e.g., about 25 ounces, e.g., about 26 ounces, e.g., about 27 ounces, e.g., about 28 ounces, e.g., about 29 ounces, e.g., to about 30 ounces of fuel or more. In certain embodiments, the candle container may vary in size to hold about 4 ounces to about 25 ounces of fuel, e.g., about 4 ounces, e.g., about 5 ounces, e.g., about 6 ounces, e.g., about 7 ounces, e.g., about 8 ounces, e.g., about 9 ounces, e.g., about 10 ounces, e.g., about 11 ounces, e.g., about 12 ounces, e.g., about 13 ounces, e.g., about 14 ounces, e.g., about 15 ounces, e.g., about 16 ounces, e.g., about 17 ounces, e.g., about 18 ounces, e.g., about 19 ounces, e.g., about 20 ounces, e.g., about 21 ounces, e.g., about 22 ounces, e.g., about 23 ounces, e.g., about 24 ounces, e.g., to about 25 ounces of fuel or more. In certain embodiments, the candle container may vary in size to hold about 4 ounces to about 22 ounces of fuel, e.g., about 4 ounces, e.g., about 5 ounces, e.g., about 6 ounces, e.g., about 7 ounces, e.g., about 8 ounces, e.g., about 9 ounces, e.g., about 10 ounces, e.g., about 11 ounces, e.g., about 12 ounces, e.g., about 13 ounces, e.g., about 14 ounces, e.g., about 15 ounces, e.g., about 16 ounces, e.g., about 17 ounces, e.g., about 18 ounces, e.g., about 19 ounces, e.g., about 20 ounces, e.g., about 21 ounces, e.g., to about 22 ounces of fuel or more. In still other certain embodiments, the candle container may vary in size to hold about 6 ounces to about 16 ounces of fuel, e.g., about 6 ounces, e.g., about 7 ounces, e.g., about 8 ounces, e.g., about 9 ounces, e.g., about 10 ounces, e.g., about 11 ounces, e.g., about 12 ounces, e.g., about 13 ounces, e.g., about 14 ounces, e.g., about 15 ounces, e.g., about 16 ounces of fuel or more. In particular embodiments, the candle container may vary in size to hold about 8 ounces to about 16 ounces of fuel, e.g., about 8 ounces, e.g., about 9 ounces, e.g., about 10 ounces, e.g., about 11 ounces, e.g., about 12 ounces, e.g., about 13 ounces, e.g., about 14 ounces, e.g., about 15 ounces, e.g., about 16 ounces of fuel or more. In particular embodiments, the candle container may vary in size to hold about 9 ounces to about 16 ounces of fuel, e.g., about 9 ounces, e.g., about 10 ounces, e.g., about 11 ounces, e.g., about 12 ounces, e.g., about 13 ounces, e.g., about 14 ounces, e.g., about 15 ounces, e.g., about 16 ounces of fuel or more. In yet other particular embodiments, the candle container may vary in size to hold about 10 ounces to about 16 ounces of fuel, e.g., about 10 ounces, e.g., about 11 ounces, e.g., about 12 ounces, e.g., about 13 ounces, e.g., about 14 ounces, e.g., about 15 ounces, e.g., about 16 ounces of fuel or more. In a specific embodiment, the candle container holds about 9 ounces of fuel. In an alternative specific embodiment, the candle container holds about 16 ounces of fuel.

Fuels

The fuel used to prepare the cool-touch thermally-protected candle assembly (CTCA) of the present invention may be any combustible material ignitable by a flame or spark. The fuel for the candle may be liquid, semi-soft, soft, semi-solid, or solid at room temperature, in its unlit or unheated form, e.g., an oil, a gel, or a wax. A solid fuel may become semi-solid, semi-soft, soft, or liquid upon exposure to high temperatures, e.g., 100°-200° F. or higher, or to a flame, e.g., a candle flame. In one embodiment, the fuel is combustible. In one embodiment, the fuel is meltable. In another embodiment, the fuel further comprises an odorant and/or a colorant. In another embodiment, the fuel is wax.

Wax, in its unlit or unheated form, may be solid or liquid at room temperature, e.g., approximately 75° F. and approximately 50% humidity. Any wax, e.g., liquid wax or solid wax, is suitable for use in preparing the thermally-protected candle assembly present invention. In one embodiment, a solid, meltable wax is used to prepare the CTCA of the present invention. In certain embodiments, the solid, meltable wax is combustible.

Wax may be derived from many sources including, but not limited to, plants, animals, and minerals, or may be synthesized, e.g., synthetic wax. Animal-based waxes suitable for use in practicing the present invention include, but are not limited to, whale oil wax, hardened beef tallow oil, or hardened fish oil. Beeswax, e.g., as obtained from honey bee hives, is suitable for use in preparing the thermally-protected candle assembly present invention. Suitable plant-based waxes include, but are not limited to, soy wax, carnauba wax, candelilla wax, hardened rapeseed oil, palm wax, sugar cane wax, vegetable tallow, rice bran wax, jojoba wax or bayberry wax. Mineral-based waxes, e.g., ceresin or ozokerite wax, petroleum-based waxes e.g., paraffin wax, microcrystalline wax, crystalline wax, paraffin oxide wax, and petrolatum oxide wax, and synthetic waxes e.g., ethylene-vinyl acetate copolymer wax, ethylene-acrylate copolymer wax, vinyl ether wax, polyethylene wax, are each, or in any combination thereof, suitable for use in preparing the CTCA of the present invention. Hydrocarbon gel waxes, e.g., waxes made from mineral oil, ethylene/propylene/styrene copolymer, and butylene/ethylene/styrene copolymer, e.g., any and all grades of VERSAGEL®, are suitable for use in preparing the CTCA of the present invention.

Different wax types, and thus combinations or formulations of wax, combust or melt at different temperatures. For example, the typical melting points for different grades of paraffin wax ranges from approximately 115° F. to approximately 154° F. Beeswax typically melts at approximately 144° F. to approximately 147° F. Pure soy wax typically melts at approximately 121° F. to approximately 125° F. Any combination of any of the aforementioned waxes, resulting in a formulation of any melting point, is suitable for use in preparing the CTCA of the invention.

Pure soy wax is considered to be one of the more difficult waxes to work with to prepare candles. Soy wax is a vegetable wax made from soybean oil that has been subjected to a hydrogenation process. This process converts some of the fatty acids in the oil from an unsaturated form to a saturated form. The hydrogenation dramatically alters the constitution of the oil, making it a solid, rather than a liquid, at room temperature, e.g., approximately 75° F. and approximately 50% humidity. The low melting point of pure soy wax requires the use of a container to prepare the candle, limiting the variety and type of candles that can be made. Additionally, soy wax often burns in an uneven manner and fails to form an even pool of melted fuel across and atop the unmelted wax. Such candles are prone to tunneling and thus do not provide the maximum safety and experience profiles.

The CTCA of the present invention may be prepared using any wax, either in a pure form or in any combination with any other wax or waxes, and the wax may be optionally fragranced with an odorant and optionally tinted with a colorant. In one embodiment, the present invention employs a pure plant-based wax, a pure petroleum-based wax, a pure animal-based wax, a gel wax, or any combination thereof. In certain embodiments, the present invention employs a pure plant-based wax. In particular embodiments, the pure plant-based wax is soy wax. In a specific embodiment, the pure plant-based wax is about 99-100% soy wax. In an alternative specific embodiment, the pure plant-based wax is about 99.9-100% soy wax.

Wicks

Any candle wick suitable for preparing a candle is suitable for preparing the cool-touch thermally-protected candle assembly (CTCA) of the invention. Wicks are available in many various sizes, shapes, and constructions which affect safety and performance of a candle assembly in use, e.g., flame height, burn rate, wax pool size, ability to self-trim, etc., and during the candle making process e.g., stability and ability to self-support.

Candle wicks are commonly braided or woven from multiple fiber or filamentary yarns. Cotton is the most common fiber for making wicks, although fibers such as rayon, nylon or hemp are also employed. Fiber wicks are often assembled around or with a central core of sturdy material which aids the wick in remaining straight; the core material may be any combustible metal wire, such as, but not limited to, zinc or lead. Fiber wicks can also braided or woven to incorporate paper as an integral and supportive part of the wick. The paper may be braided and/or woven directly into the wick along with the fiber. Wicks may also be made of paper. Fiber, paper, and paper-fiber combination wicks are typically infused with and/or surrounded by wax, e.g., a plant-based wax or a high-melting temperature paraffin wax, which imparts stiffness to the wick and affects the burning of the wick in a lit candle. Wicks may also be made of wood, e.g., soft wood, hard wood, or a combination thereof.

Several factors must be considered when choosing a fiber, paper, paper-fiber combination, or wooden wick, such as type of weave, type of wood, type of paper, type of wax in or around the wick, core material, size, e.g., diameter, width or thickness, density of the wick material, capillary flow ability and rate, and the like. A typically functional braided wick can produce an approximately three-inch diameter wax pool while maintaining an approximately three-inch flame height.

In one embodiment, the CTCA of the invention is prepared with one or more fiber, paper, paper-fiber combination, or wooden wicks, or a combination thereof. In certain embodiments, the CTCA of the invention is prepared with one or more fiber or paper-fiber combination wicks. In particular embodiments, the CTCA of the invention is prepared with one or more fiber wicks; in a specific embodiment, a single fiber wick is employed. In another embodiment, the CTCA of the invention is prepared with one or more cotton fiber wicks; in certain embodiments, a single cotton fiber wick is employed. In particular embodiments, the CTCA of the invention is prepared with one or more lead-free or zinc-free cotton wicks, e.g., a "RDD" cotton wick; in a specific embodiment, a single lead-free or zinc-free cotton wick is employed, e.g., a "RDD" cotton wick.

The reflective nature of the TPM or a TPWL, e.g., an FIV label, of the invention allows the return and diffusion of heat from combustion or melting back into the fuel, container material, and other contents of a container candle assembly. As such, single wick cool-touch candles of the invention can be prepared using a smaller-sized wick than a container candle lacking the TPM or a TPWL, e.g., an FIV label, of the invention. Candles larger than about 20 or so ounces are traditionally prepared with extra large wicks or with two or more wicks. Multi-wick cool-touch candles of the invention can be prepared using smaller-sized and/or fewer wicks than a multi-wick container candle lacking the TPM or a TPWL, e.g., an FIV label, of the invention. Thus, the TPM or a TPWL, e.g., an FIV label, of the invention provides for the manufacture of candles with smaller sized and/or fewer wicks to achieve an evenly burning candle; such construction provides for candles with increased safety and experience profiles.

Odorants

The fuel of a candle, e.g., the wax of the cool-touch thermally-protected candle assembly (CTCA) of the invention, may be optionally fragranced with an odorant, e.g., a volatile odorant, to emit fragrance into an area surrounding the candle assembly. Many types of odorants may be used to fragrance the fuel of candle, such as but not limited to, perfume oils, fragrance oils, aromatic oils, essential oils, and the like, or combinations thereof. Odorants may be pleasant, e.g., a pleasing fragrance, an aromatherapy fragrance, and the like, or any combination thereof. Odorants may also be functional, e.g., aromatherapeutic, an insecticide, an insect repellant, an insect attractant, an air-freshener, a deodorizer, or the like, and combinations thereof. Odorants are soluble in and/or dispersible into the fuel, e.g., wax, of a candle.

Odorants typically release aroma from a fuel, e.g., wax, both when the fuel is at room temperature and when the fuel is in use, e.g., semi-solid, semi-soft, soft, or molten, during combustion, and the like. In one embodiment, the fuel, e.g., wax, of the CTCA of the invention is scented with one or more perfume oils, fragrance oils, aromatic oils, essential oils, and the like, or combinations thereof. In certain embodiments, the fuel, e.g., wax, of the CTCA of the invention is scented with one or more fragrance oils, essential oils, or combinations thereof. In particular embodiments, the fuel, e.g., wax, of the CTCA of the invention is scented with one or more fragrance oils. In particular embodiments, the fuel, e.g., wax, of the CTCA of the invention is scented with one or more essential oils.

The amount of odorant to be added to any given amount of fuel, e.g., wax, is typically determined experimentally, e.g., adding increasing percentages of odorant to a fuel, e.g., wax, to a percentage where the fragrance released imparts the amount of scent desired and/or imparts a maximum amount, e.g., peak amount, of scent. Different types of fuel, e.g., wax, and/or combinations of fuels, e.g., waxes, absorb and release different amounts of odorants. Addition of higher amounts of odorant to a fuel, e.g., wax, beyond the peak amount does not offer any additional advantage with regard to fragrancing or scenting a space. Addition of odorant to a fuel, e.g., wax, beyond the peak amount may negatively affect the appearance, e.g., causing weeping or mottling of the wax, and safety, e.g., burning properties, of a candle assembly.

The flash point of odorants may vary from about 100° F. to about 200° F., or more. Odorants may have low flash points, e.g., about 100° F., e.g., about 110° F., e.g., about 120° F., e.g., about 130° F., e.g., about 140° F., e.g., about 150° F., e.g., about 160° F., e.g., about 170° F., or even about e.g., 180° F. Odorants may have high flash points, e.g., about 190° F., e.g., about 200° F., or even greater than 200° F. e.g., about 210° F., or more. The lower the flash point of the odorant, the greater the likelihood that the odorant will combust when in use, e.g., when exposed to a flame, or when exposed to hot wax, e.g., during candle manufacture or e.g., in the semi-solid, semi-soft, soft, or liquid molten wax of a candle on an operating candle warming plate. Combustion of the odorant independent of the combustion or melting of the fuel is undesirable. Thus, in one embodiment, the flash point of the odorant is relatively high, e.g., about 185° F., e.g., about 190° F., e.g., about 200° F., or even greater than 200° F., e.g., about 210° F., or more. In certain embodiments, the flash point of the odorant is high, e.g., about 190° F., e.g., about 200° F., or even greater than 200° F., e.g., about 210° F., or more. In particular embodiments, the flash point of the odorant is very high, e.g., about 200° F., or even greater than 200° F., e.g., about 210° F., or more.

In one embodiment, the fuel, e.g., wax, of the CTCA of the present invention is fragranced with about 0.1% to about 30%, weight to weight, of odorant to fuel, e.g., wax. In certain embodiments, the fuel, e.g., wax, of the CTCA of the present invention is fragranced with about 1% to about 30%, weight to weight, of odorant to fuel, e.g., wax. In certain embodiments, the fuel, e.g., wax, of the CTCA of the present invention is fragranced with about 1% to about 25%, e.g., about 1%, e.g., about 2%, e.g., about 3%, e.g., about 4%, e.g., about 5%, e.g., about 6%, e.g., about 7%, e.g., about 8%, e.g., about 9%, e.g., about 10%, e.g., about 11%, e.g., about 12%, e.g., about 13%, e.g., about 14%, e.g., about 15%, e.g., about 16%, e.g., about 17%, e.g., about 18%, e.g., about 19%, e.g., about 20%, e.g., about 21%, e.g., about 22%, e.g. about 23%, about 24%, e.g., or about 25%, weight to weight, of odorant to fuel, e.g., wax. In certain embodiments, the fuel, e.g., wax, of the CTCA of the present invention is fragranced with about 2% to about 20%, e.g., about 2%, e.g., about 3%, e.g., about 4%, e.g., about 5%, e.g., about 6%, e.g., about 7%, e.g., about 8%, e.g., about 9%, e.g., about 10%, e.g., about 11%, e.g., about 12%, e.g., about 13%, e.g., about 14%, e.g., about 15%, e.g., about 16%, e.g., about 17%, e.g., about 18%, e.g., about 19%, or e.g., about 20%, weight to weight, of odorant to fuel, e.g., wax. In certain embodiments, the fuel, e.g., wax, of the CTCA of the present invention is fragranced with about 3% to about 15%, e.g., about 3%, e.g., about 4%, e.g., about 5%, e.g., about 6%, e.g., about 7%, e.g., about 8%, e.g., about 9%, e.g., about 10%, e.g., about 11%, e.g., about 12%, e.g., about 13%, e.g., about 14%, or e.g., about 15%, weight to weight, of odorant to fuel, e.g., wax. In particular embodiments, the fuel, e.g., wax, of the CTCA of the present invention is fragranced with about 4% to about 10%, e.g., about 4%, e.g., about 5%, e.g., about 6%, e.g., about 7%, e.g., about 8%, e.g., about 9%, or e.g., about 10%, weight to weight, of odorant to fuel, e.g., wax. In particular embodiments, the fuel, e.g., wax, of the CTCA of the present invention is fragranced with about 5% to about 9%, e.g., about 5%, e.g., about 6%, e.g., about 7%, e.g., about 8%, e.g., or about 9%, weight to weight, of odorant to fuel, e.g., wax. In a specific embodiment, the fuel, e.g., wax, of the CTCA of the present invention is fragranced with about 6% to about 8%, e.g., about 6%, e.g., about 7%, e.g., or about 8%, weight to weight, of odorant to fuel, e.g., wax.

In certain embodiments, the fuel, e.g., wax, of the CTCA of the present invention is fragranced with about 6%, weight to weight, e.g., about 6.25%, of odorant to fuel, e.g., wax. In certain embodiments, the fuel, e.g., wax, of the CTCA of the present invention is fragranced with about 7%, weight to weight, of odorant to fuel, e.g., wax. In certain embodiments, the fuel, e.g., wax, of the CTCA of the present invention is fragranced with about 8%, weight to weight, of odorant to fuel, e.g., wax. In certain embodiments, the fuel, e.g., wax, of the CTCA of the present invention is fragranced with about 9%, weight to weight, e.g., about 9.5%, of odorant to fuel, e.g., wax. In still other certain embodiments, the fuel, e.g., wax, of the CTCA of the present invention is fragranced with about 10%, weight to weight, of odorant to fuel, e.g., wax. In certain embodiments, the fuel, e.g., wax, of the CTCA of the present invention is fragranced with about 11%, weight to weight, of odorant to fuel, e.g., wax. In certain embodiments, the fuel, e.g., wax, of the CTCA of the present invention is fragranced with about 12%, weight to weight, e.g., about 12.5%, of odorant to fuel, e.g., wax. In still other certain embodiments, the fuel, e.g., wax, of the CTCA of the present invention is fragranced with about 13%, weight to weight, of odorant to fuel, e.g., wax.

Colorants

The contents of a candle assembly, e.g., the fuel, e.g., the wax of the CTCA of the present invention, may be optionally tinted or colored. Colorants suitable for use in tinting the contents of a candle assembly, e.g., the fuel, e.g., the wax, include, but are not limited to, dyes, pigments, and combinations thereof.

Dye type colorants typically comprise organic molecules; many dye type colorants are oil soluble and therefore may be dissolved into an oil-based odorant. Dye type colorants may also be added directly into the fuel, e.g., wax, of a candle assembly, e.g., the CTCA of the present invention. Dye type colorants are often added to a wax fuel, and the colorant/wax fuel combination is melted together for use in producing a candle assembly, e.g., the CTCA of the present invention. Dye type colorants may suffer from photo bleaching and/or oxidation which may result in unfavorable discoloration of the fuel, e.g., wax, in the candle assembly.

Pigment type colorants typically comprise inorganic molecules; most pigment type colorants are insoluble in oil and therefore are suspended in the fuel, e.g., wax, of a candle assembly, e.g., the CTCA of the present invention. Pigment type colorants may be added to a wax fuel, and the colorant/wax fuel combination is melted for use in producing a candle assembly, e.g., the CTCA of the present invention. Unlike dye colorants, pigment type colorants do not suffer from photo bleaching.

The amount of colorant to be added to any given amount of fuel, e.g., wax, is typically determined experimentally, e.g., adding increasing percentages of colorant to a fuel, e.g., wax, to a percentage where the color of the fuel, e.g., wax, is the desired color. Different types of fuel, e.g., wax, and/or combinations of fuels, e.g., waxes, absorb and release different amounts of colorants. Addition of excess colorant to a fuel, e.g., wax, may negatively affect the safety, e.g., burning properties, of a candle assembly. Excessively tinted contents of a candle assembly, e.g., the fuel, e.g., the wax, may clog the candle wick, increase sputtering, decrease overall burning efficiency, and the like.

In one embodiment, contents of a candle assembly, e.g., the fuel, e.g., the wax, of the CTCA of the present invention is tinted or colored with about 0.1% to about 2%, weight to weight, of colorant to fuel, e.g., wax.

Photo bleaching and/or oxidation of colorants present in the contents of a candle assembly may be prevented or mitigated by the addition of chemicals which inhibit photo bleaching, e.g., by ultraviolet (UV) light, and/or oxidation of the colorants, e.g., by heat and/or combustion. As with odorants and colorants, UV and oxidation inhibiting chemicals may be added to the fuel, e.g., wax, of a candle assembly, e.g., the CTCA of the present invention. UV inhibitor chemicals function by absorbing ultraviolet light impinging upon the contents of a candle assembly. Oxidation inhibitor chemicals, e.g., antioxidants, absorb free radicals in the contents of a candle assembly.

The thermally-protective material (TPM) or a cool-touch, thermally protective candle wrap or label (TPWL), e.g., an FIV label, of the present invention provides the option for external UV inhibition and protection of the candle fuel. Use of a TPM or a TPWL, e.g., an FIV label, of the invention to wrap, encircle or surround a candle assembly, e.g., the CTCA of the invention, eliminates the need for the addition of UV-inhibitor chemicals to the contents of a candle assembly. Thus, the present invention provides the option of preparing the contents of a candle assembly without UV-inhibitor chemicals. Thus, the TPM or a TPWL, e.g., an FIV label, of the invention provides for the manufacture of candles with smaller sized and/or fewer wicks to achieve an evenly burning candle; such construction provides for candles with increased safety and experience profiles.

Thermally-Protective Labels or Wraps

The thermally-protective label or wrap suitable for making the CTCA of the present invention is made of the TPM according to any embodiment of the invention as described herein (see II. The Thermally-Protective Material (TPM) of the Invention and III. The Cool-Touch Thermally-Protective Candle Wrap or Label (TPWL) of the Invention). In one embodiment, the thermally-protective label or wrap is prepared from a translucent thermally-protective material comprising a first layer of translucent Frosted Ice Vinyl material and one outer layer of transparent Frogskin™, e.g., an FIV label, where the Frosted Ice Vinyl material is thermally printed upon with one or more applications of thermally applied foil resin ink.

The Cool-Touch Thermally-Protected Candle Assembly

In one embodiment, the invention provides a CTCA comprising a container, a fuel, and at least one wick, where the container is encircled by or surrounded by the optionally printed upon TPM or a TPWL, e.g., an FIV label, of the invention made therefrom. In certain embodiments, the fuel is combustible. In certain embodiments, the fuel is meltable. In particular embodiments, the fuel comprises an odorant and/or colorant. In a specific embodiment, the fuel is wax.

In one embodiment, the invention provides a CTCA comprising a container, a fuel, and at least one wick, where the container is encircled by or surrounded by the translucent, optionally printed upon, TPM or a TPWL, e.g., an FIV label, of the invention made therefrom. In certain embodiments, the TPM or a TPWL, e.g., an FIV label, is thermally printed upon. In particular embodiments, the fuel is combustible. In particular embodiments, the fuel is meltable. In particular embodiments, the fuel comprises an odorant and/or colorant. In a specific embodiment, the fuel is wax.

In one embodiment, the invention provides a CTCA where the container is a glass container or metal container, the fuel is wax, and the wick is a single, lead-free wick, where the container is encircled by or surrounded by the translucent, optionally printed upon, TPM or a TPWL, e.g., an FIV label, of the invention. In certain embodiments, the TPM or TPWL, e.g., an FIV label, is thermally printed upon. In certain embodiments, the wax is selected from the group consisting of petroleum-based wax, synthetic-wax, plant-based wax, mineral wax, animal-based wax, and any other natural wax, or any combination thereof. In particular embodiments, the wax fuel comprises an odorant and/or colorant.

In one embodiment, the invention provides a CTCA, where the container is a glass container, the fuel is pure soy wax, and the wick is a single, lead-free cotton wick, where the container is encircled by or surrounded by the translucent, optionally printed upon, TPM or a TPWL, e.g., an FIV label, of the invention made therefrom. In certain embodiments, the TPM or TPWL, e.g., an FIV label, is thermally printed upon. In particular embodiments, the wax fuel comprises an odorant and/or colorant. In a specific embodiment, the glass is heat resistant glass.

In one embodiment, the invention provides a CTCA where the container is a glass container, the fuel is pure soy wax, and the wick is a single, lead-free cotton wick, where the container is encircled by or surrounded by the translucent, printed upon TPM or a TPWL, e.g., an FIV label, of the invention made therefrom. In particular embodiments, the wax fuel comprises an odorant and/or colorant. In a specific embodiment, the glass is heat resistant glass.

In one embodiment, the invention provides a CTCA where the container is a glass container, the fuel is pure soy wax, and the wick is a single, lead-free cotton wick, where the container is encircled or surrounded by the translucent, thermally printed upon TPM or a TPWL, e.g., an FIV label, of the invention made therefrom. In particular embodiments, the wax fuel comprises an odorant and/or colorant. In a specific embodiment, the glass is heat resistant glass.

V. The Safety-Enhanced Candle Assembly of the Invention

The present invention relates to compositions for enhancing, improving, or increasing the safety profile of any candle, e.g., a pure soy candle, or e.g., a paraffin candle. The thermally-protective material (TPM) or a cool-touch, thermally protective candle wrap or label (TPWL), e.g., an FIV label, made therefrom that resists the absorption of heat of the invention, when encircling or surrounding the container of any container candle, improves the safety profile of, and thus protects, the consumer from typical safety hazards associated with a candle in use. When in place surrounding any container candle, the TPM or a TPWL, e.g., an FIV label, of the invention made therefrom transforms the container candle into a cool-touch thermally-protected candle assembly (CTCA).

Safety Profile

It is important to burn any and all candles in a safe manner. Candle fires may be initiated by a ignition of an item, e.g., a flammable item, external to the candle assembly, e.g., a curtain, coming into contact with a candle flame. Candle-initiated fires may also occur when flashover occurs, that is when the fuel, e.g., wax in a semi-solid, semi-soft, soft, or molten state, reaches an unsafe temperature causing combustion of the fuel. Candle-initiated fires may also result when wick slide occurs, that is when wick travels within a liquid fuel, e.g., wax in a semi-solid, semi-soft, soft, or molten state, causing a container to overheat, melt, shatter or break, releasing the flame and heated contents of the candle assembly. A candle need not start a fire to be dangerous; a fuel source heated by a candle flame, e.g., semi-solid, semi-soft, soft, or molten wax, can reach temperatures which may cause serious burns upon contact with skin, or damage to an item upon contact.

Candles utilize capillary action to burn a given fuel source, e.g., wax, or e.g., a fuel that is liquid at room temperature. When the fuel source is solid at room temperature, the candle flame first melts the solid fuel source, e.g., wax, into a melted and molten liquid form. The liquid fuel source, e.g., melted wax or oil, flows up the wick and is vaporized and combusted in the candle flame; some of the vapor is partially decomposed in the middle portion of the flame while the remaining vapor is combusted in the outer portion of the flame. The combustion of the fuel, releases carbon dioxide, water, and other vapors into the surrounding atmosphere, e.g., scented vapors.

Evaluation of the safety profile of a candle assembly involves inspection of a number of parameters, including but not limited to, flame height, flame size, time required for pool formation, stability, smoking, flaring, sputtering, overflow, external surface temperature of the candle assembly, re-ignition, afterglow, direct flame impingement, carbon deposit, soot emissions, temperature of the fuel, e.g., temperature of a wax pool, time required for the fuel to cool to room temperature and/or re-solidify, occurrence of wick slide, uneven consumption of fuel, combustion of a fuel, e.g., flashover, occurrence of weight redistribution, integrity of the container housing the candle, e.g., shattering, cracking or other compromising of the integrity of the container housing the candle after exposure to heat, and shattering, cracking or other compromising of the integrity of the container housing the candle upon contact with another item, e.g., when dropped onto a floor, or any combination thereof.

The improved, enhanced or increased safety profile of a candle assembly may be assessed by any or all of the parameters listed.

Flame Characteristics

The height, size and manner of performance of a candle flame is dependent upon the combination of fuel, wick, and container type and size of a candle assembly. A candle flame may exhibit numerous operational defects including, but not limited to instability, smoking, flaring, sputtering, overflow or drowning, re-ignition or afterglow, carbon deposits or mushrooming, soot emissions, and the like, or any combination thereof.

The metal flecks, e.g., the aluminum flecks, of the vinyl of the TPM or a TPWL, e.g., an FIV label, of the invention allow the reflection and diffusion of heat from the candle flame and hot fuel back into the contents of the candle, e.g., wax. This diffusion of heat back into the CTCA candle contents reduces temperature fluctuations within the contents of and in the space surrounding the candle, allowing the flame to burn in a more consistent and safe manner. As such, the CTCA of the invention allows utilization of a smaller wick than an identical candle assembly not protected by the TPM or a TPWL, e.g., an FIV label, of the invention, reducing and stabilizing flame height and size, and decreasing smoking, flaring, sputtering, overflow or drowning, re-ignition or afterglow, carbon deposits or mushrooming, and soot emissions.

Pool Formation

Successful liquid pool formation of a solid fuel, e.g., wax, is also dependent upon the combination of fuel, wick, and container type and size of a candle assembly. Uneven or poor pool formation of molten wax results in the molten fuel cooling and adhering to the container wall, forming a ring of solid fuel along the interior wall of the container. Formation of the wax ring removes fuel from the pool, resulting in uneven consumption of fuel, undesired combustion of a fuel, e.g., flashover, occurrence of weight redistribution, tunneling, and the like, or any combination thereof.

The thermally protective nature of the TPM or a TPWL, e.g., an FIV label, of the invention reduces the effects of external temperature changes on the wax adjacent to the exterior walls of the candle container. This characteristic, in combination with the ability to diffuse heat back into the candle contents, reduces the likelihood of melted and molten wax fuel cooling and forming a ring of solid fuel along the interior wall of the container. As such, the CTCA of the invention provides more successful pool formation than an identical candle assembly not protected by the TPM or a TPWL, e.g., an FIV label, of the invention, reducing uneven consumption of fuel, undesired combustion of a fuel, e.g., flashover, occurrence of weight redistribution, and tunneling.

External Surface Temperature

The external surface temperature, e.g., the temperature of the exterior side, reached by a container candle is also dependent upon the combination of fuel, wick, and container type and size of a candle assembly. For example, the exterior temperature of a 9 ounce, single-wick, pure soy wax candle lacking any type of label or wrap in use, e.g., a lit and burning candle, may exceed about 151° F., about 167° F., or more. For example, the exterior temperature of a 16 ounce, single-wick, pure soy wax candle lacking any type of label or wrap in use, e.g., a lit and burning candle, may exceed about 157° F., about 158° F. or more. For example, the exterior temperature of a 7 or 22 ounce single-wick, paraffin candle lacking any type of label or wrap in use, e.g., a lit and burning candle, may exceed about 157° F., or about 145° F., or more, respectively. For example, the exterior temperature of a 22 ounce 2-wick, paraffin candle lacking any type of label or wrap in use, e.g., a lit and burning candle, may exceed about 185° F. or more. Candles exhibiting such high external temperatures are dangerous to touch or handle, may damage materials or goods coming into contact with the container, and the container may crack or shatter, releasing molten wax.

The thermally protective nature of the TPM or a TPWL, e.g., an FIV label, of the invention made therefrom reduces the maximum external temperature reached by the exterior walls of a candle container compared to a candle lacking a TPM or a TPWL, e.g., an FIV label, of the invention. The exterior temperature of a CTCA in use, e.g., a lit and burning candle, remains cool to the touch.

The maximum in-use external temperature reached by a 9 ounce, single-wick, pure soy wax lacking any type of label or wrap is at least about 10% hotter, e.g., about 12% hotter, e.g., about 15% hotter, e.g., even about 20% hotter, or more, compared to the maximum in-use external temperature reached by a 9 ounce, single-wick, pure soy wax CTCA according to the invention. For example, a 9 ounce, single-wick, pure soy wax CTCA in use reaches a maximum external temperature of e.g., about 135° F. or less, or e.g., even about 132° F., or less. The maximum in-use external temperature reached by a 16 ounce, single-wick, pure soy wax lacking any type of label or wrap is at least about 10% hotter, e.g., about 12% hotter, e.g., about 15% hotter, e.g., even about 20% hotter, or more, compared to the in-use maximum external temperature reached by a 16 ounce, single-wick, pure soy wax CTCA according to the invention. For example, the exterior of a 16 ounce, single-wick, pure soy wax CTCA in use exhibits a maximum external temperature of e.g., about 136° F. or less, or e.g., about 135° F., or less.

The maximum in-use external temperature reached by a 7 ounce, single-wick, paraffin wax candle lacking any type of label or wrap is at least about 14% hotter, e.g., about 15% hotter, or more, compared to the maximum in-use external temperature reached by a 7 ounce, single-wick, paraffin wax CTCA according to the invention. For example, the exterior of a 7 ounce, single-wick, paraffin wax CTCA in use reaches a maximum external temperature of e.g., about 137° F. or less. The maximum in-use external temperature reached by a 22 ounce, single-wick, paraffin wax candle lacking any type of label or wrap is at least about 7% hotter, e.g., about 7.4% hotter, or more, compared to the maximum in-use external temperature reached by a 22 ounce, single-wick, paraffin wax CTCA according to the invention. For example, the exterior of a 22 ounce, single-wick, paraffin wax CTCA in use reaches a maximum external temperature of e.g., about 135° F. or less. The maximum in-use external temperature of 22 ounce, 2-wick, paraffin wax candle lacking any type of label or wrap is at least about 4.5% hotter, e.g., about 4.8% hotter, or more, compared to the maximum in-use external temperature reached by a 22 ounce, 2-wick, paraffin wax CTCA according to the invention. For example, the exterior of a 22 ounce, 2-wick, paraffin wax CTCA in use reaches a maximum external temperature of e.g., about 177° F. or less.

As such, the CTCA of the invention is cooler to the touch than an identical candle assembly not protected by the TPM or a TPWL, e.g., an FIV label, of the invention, increasing the overall safety of the candle to the consumer and consumer's possessions.

Fuel Temperature

The temperature of the fuel reached by a candle in use, e.g., the semi-solid, semi-soft, soft, or molten wax, is also dependent upon the combination of fuel, wick, and container type and size of a candle assembly.

For example, the wax of a 9 ounce, single-wick, pure soy wax candle lacking any type of label or wrap in use, e.g., a lit and burning candle, typically gets quite hot, e.g., exceeding about 178° F., e.g., exceeding about 185° F., or more. For example, the wax of a 16 ounce, single-wick, pure soy wax candle lacking any type of label or wrap in use, e.g., a lit and burning candle, may exceed e.g., about 168° F., e.g., about 170° F., or more. For example, the wax of 7 or 22 ounce, single-wick, paraffin wax candles lacking any type of label or wrap in use, e.g., a lit and burning candle, may exceed about 168° F., or e.g., about 148° F., or more, respectively. For example, the wax of 22 ounce, 2-wick, paraffin wax candle lacking any type of label or wrap in use, e.g., a lit and burning candle, may exceed, e.g., about 208° F., or more. Candles exhibiting such high wax temperatures may exhibit wick slide, increasing the likelihood of ignition of items external to the candle container. Candles exhibiting such high wax temperatures are dangerous to handle, may damage materials or goods coming into contact with the hot fuel, and the container may crack or shatter, releasing hot molten wax.

The thermally protective nature of the TPM or a TPWL, e.g., an FIV label, of the invention reduces the maximum molten wax temperature of the fuel reached by a candle compared to the fuel of a candle lacking a TPM or a TPWL, e.g., an FIV label, of the invention.

The maximum in-use temperature of molten wax reached by a 9 ounce, single-wick, pure soy wax lacking any type of label or wrap is at least about 10% hotter, e.g., about 12% hotter, e.g., about 15% hotter, e.g., about 20% hotter, e.g., about 22% hotter, or more, compared to the in-use maximum molten wax temperature reached by a 9 ounce, single-wick, pure soy wax CTCA according to the invention. For example a 9 ounce, single-wick, pure soy wax CTCA reaches a maximum molten wax temperature of e.g., about 158° F. or less, e.g., about 155° F., e.g., about 153° F., or less. The maximum in-use temperature of molten wax reached by a 16 ounce, single-wick, pure soy wax lacking any type of label or wrap is at least about 3% hotter, e.g., about 4% hotter, e.g., about 5% hotter, e.g., about 8% hotter, e.g., about 10% hotter, or more, compared to the in-use maximum molten wax temperature reached by a 16 ounce, single-wick, pure soy wax CTCA according to the invention. For example, a 16 ounce, single-wick, pure soy wax CTCA reaches a maximum molten wax temperature of e.g., about 164° F. or less, e.g., about 160° F., e.g., about 155° F., e.g., about 153° F., or less.

The maximum in-use molten wax temperature reached by a 7 ounce, single-wick, paraffin wax candle lacking any type of label or wrap is at least about 10% hotter, e.g., about 10.6% hotter, or more, compared to the maximum in-use molten wax temperature reached by a 7 ounce, single-wick, paraffin wax CTCA according to the invention. For example, the fuel of a 7 ounce, single-wick, paraffin wax CTCA in use reaches a maximum molten wax temperature of e.g., about 152° F. or less. The maximum in-use molten wax temperature reached by a 22 ounce, single-wick, paraffin wax candle lacking any type of label or wrap is at least about 3% hotter, e.g., about 3.6% hotter, or more, compared to the maximum in-use molten wax temperature reached by a 22 ounce, single-wick, paraffin wax CTCA according to the invention. For example, the fuel of a 22 ounce, single-wick, paraffin wax CTCA in use reaches a maximum molten wax temperature of e.g., about 201° F. or less. As such, the semi-solid, semi-soft, soft, or molten fuel of the CTCA of the invention is cooler to the touch than an identical candle assembly not protected by the TPM or a TPWL, e.g., an FIV label, of the invention, increasing the overall safety of the candle to the consumer and consumer's possessions.

Container Integrity

The integrity of the container housing candle in use, e.g., lit or upon an active candle heater plate, is also dependent upon the combination of fuel, wick, and container type and size of a candle assembly. Container candles in use can reach maximum external temperatures ranging from about 150° F. to greater than about 180° F., or more, and maximum molten wax temperatures ranging from of about 170° F. to greater than about 220° F., or more. Such high temperatures may stress the container housing the candle, e.g., a glass container, such that the container cracks, shatters or breaks in some manner, projecting pieces of the container, e.g., glass shards, and releasing hot fuel, e.g., heated semi-solid, semi-soft, soft, or molten wax.

The thermally protective nature of the TPM or a TPWL, e.g., an FIV label, of the invention reduces the external and wax temperatures reached by a candle in use. The CTCA of the invention reaches a maximum external temperature of about 136° F. or less and a maximum wax temperature of about 165° F., or less. Such cooler temperatures are far less likely to stress the container housing the candle, e.g., a glass container, greatly reducing the likelihood that the container cracks, shatters or breaks in some manner, projecting pieces of the container, e.g., glass shards, and releasing hot fuel, e.g., heated semi-solid, semi-soft, soft, or molten wax.

The TPM or a TPWL, e.g., an FIV label, of the invention, when securely encircling or surrounding a container candle assembly, also provides physical protection for a container candle. A container candle wrapped with the TPM or a TPWL, e.g., an FIV label, of the invention resists shattering, breaking, chipping, cracking and the like, when sharply contacted by another surface, e.g., dropped onto a hard surface from a height of several feet.

The cool-touch thermally-protected candle assembly of the invention, e.g., a container candle securely encircled or surrounded by the thermally-protective material of the invention, or labels or wrapped prepared therefrom, exhibits an increased safety profile. While in use, a CTCA according to the present invention burns evenly with minimum flame, exhibits reduced maximum exterior and molten wax temperatures, and offers increased container integrity as compared to an identical candle prepared without the TPM or a TPWL, e.g., an FIV label, of the invention.

VI. The Enhanced Candle Experience Profile

The present invention relates to compositions for enhancing, improving, or increasing the experience profile of any candle, e.g., a pure soy candle, or e.g., a paraffin candle. The TPM or a TPWL, e.g., an FIV label, which resists the absorption of heat of the invention, when encircling or surrounding the container of any container candle, improves the experience profile of a candle in use.

Experience Profile

In the past, candles were an integral part of a utilitarian lifestyle, functioning mainly to provide light. In more modern times, candles are used less for the production of light and more for decoration and creating ambiance. As such, the consumer experience of burning a candle goes beyond the production of light, and becomes one of enjoyment.

Assessment of the experience profile of a candle assembly includes, but is not limited to, increased hot throw, decreased tunneling, prevention of tunneling, even burning of a pure soy wax and pure cotton wick candle, increased number of hours of burn time, more constant and consistent dispersal of fragrance, improved label or wrap integrity, improved viewing of the candle flame at all times, improved safety, improved value, or any combination thereof.

The improved, enhanced or increased experience profile of a candle assembly may be assessed by any or all of the parameters listed.

Hot Throw

The dispersal of scent from a candle in use, that is the hot throw of a candle, is dependent upon the combination of fuel, wick, and container type and size of a candle assembly. Hot throw is a major factor in determining the experience profile of a candle. The vast majority of candles purchased by consumers today are scented. Consumers use scented candles to add fragrance to their homes and to make their surroundings more pleasant. Thus, a candle which imbues an area with more fragrance, and with a more constant and consistent dispersal of fragrance, will provide a consumer with increased enjoyment of the candle.

The thermally protective nature of the TPM or a TPWL, e.g., an FIV label, of the invention increases the hot throw of a candle in use. Measurement of air temperatures, evaluation of air currents, and observation of scent released from candles in use show that the CTCA of the invention funnel and move hot air up and out of the candle to a greater extent than an identical candle assembly not protected by the TPM or a TPWL, e.g., an FIV label, of the invention. The increased air movement results in increased hot throw and a more constant and consistent dispersal of fragrance, thus improving the overall candle experience.

Even Burning

The ability to burn a candle cleanly, evenly and completely is dependent upon the combination of fuel, wick, and container type and size of a candle assembly. As discussed previously, candles which burn unevenly fail to utilize all available fuel, e.g., wax. Candles prepared with soy wax are prone to burn in an uneven manner; pure soy wax candles prepared with pure cotton wicks are especially difficult to burn evenly. Consumers purchase candles with the intent to burn the candle to it's fullest potential, e.g., burning all of the wax and enjoying all of the scent and ambiance possible. Candles which burn unevenly are prone to tunneling, eventually rendering the candle unburnable. Candles which burn unevenly cannot fulfill these expectations and disappoint the consumer.

The thermally protective nature of the TPM or a TPWL, e.g., an FIV label, of the invention increases the ability of a container candle in use to burn evenly and, as such, decreases the likelihood of, or even, prevents tunneling. Soy and paraffin cool-touch thermally-protected candle assemblies of the invention consistently burn more evenly than identical candle assemblies not protected by the TPM or a TPWL, e.g., an FIV label, of the invention. The increased even burning allows the consumer to fully utilize the candle, thus improving the overall candle experience.

Burn Time

The number of hours a container candle will before self-extinguishing is also dependent upon the combination of fuel, wick, and container type and size of a candle assembly. Larger candles burn for more hours than smaller candles. Candles prepared with higher temperature burning waxes, e.g., paraffin wax, typically burn for fewer hours than candles of the same size prepared with lower temperature burning waxes, e.g., soy wax. Consumers purchase candles with the intent to burn the candle to it's fullest potential, e.g., for the longest time possible, enjoying all of the scent and ambiance possible. The length of time a candle burns also contributes to the perceived value of the candle; longer burning candles offer more value than shorter burning candles. Candles which burn quickly and extinguish early cannot fulfill these expectations and disappoint the consumer.

The thermally protective nature of the thermally-protective material (TPM) or a cool-touch, thermally protective candle wrap or label (TPWL), e.g., an FIV label, of the invention increases the number of hours a container candle burns. Soy and paraffin cool-touch thermally-protected candle assemblies of the invention burn for more hours than identical candle assemblies not protected by the TPM or a TPWL, e.g., an FIV label, of the invention.

The burn times of 9 and 16 ounce, single-wick, pure soy wax candles lacking any type of label or wrap are about 50 hours, or 65-70 hours, respectively. The burn times of 7 and 22 ounce, single-wick, paraffin wax candles lacking any type of label or wrap are about 45 and 110 hours respectively. The burn time of a 22 ounce, 2-wick, paraffin wax candle lacking any type of label or wrap is about 70 hours.

The thermally protective nature of the TPM or a TPWL, e.g., an FIV label, of the invention extends the burn time, and thus enjoyment, of a container candle compared to a candle lacking a TPM or a TPWL, e.g., an FIV label, of the invention. The burn time of a 9 ounce, single-wick, pure soy wax CTCA according to the invention is at least about 15% longer, e.g., about 16%, e.g., about 16.7%, or more compared to a 9 ounce, single-wick, pure soy wax lacking any type of label or wrap. For example, a 9 ounce, single-wick, pure soy wax CTCA according to the invention burns for about 60 hours. The burn time of a 16 ounce, single-wick, pure soy wax CTCA according to the invention is at least about 20% longer, e.g., about 25%, e.g., about 30%, e.g., about 35%, or more compared to a 16 ounce, single-wick, pure soy wax lacking any type of label or wrap. For example, a 16 ounce, single-wick, pure soy wax CTCA according to the invention burns for about 95-100 hours The burn time of a 7 ounce, single-wick, paraffin wax CTCA according to the invention is at least about 18% longer, e.g., about 18.2% longer, than the burn time of a 7 ounce, single-wick, paraffin wax candle lacking any type of label or wrap. For example, a 7 ounce, single-wick, paraffin wax CTCA according to the invention burns for about 55 hours. The burn time of a 22 ounce, 2-wick, paraffin wax CTCA according to the invention is at least about 6% longer, e.g., about 6.7% longer, than the burn time of a 22 ounce, 2-wick, paraffin wax candle lacking any type of label or wrap. For example, a 22 ounce, 2-wick, paraffin wax CTCA according to the invention burns for about 75 hours.

As such, the thermally protective nature of the TPM or a TPWL, e.g., an FIV label, of the invention increases the number of hours a container candle may burn until the fuel supply is exhausted. The increased burn time allows for more hours of enjoyment, and increased value, thus improving the overall candle experience.

Label Integrity

The integrity of a label on a container candle may be negatively affected by a number of parameters including temperature, exposure to sunlight, adhesive failure, contact with other materials, and the like or any combination thereof. Since candles must be burned in an open area, e.g., not in a closet or cupboard, and away from flammable items, candles in use are candles in view. Thus, candles, e.g., candles in use, become part of the decor and ambiance of a room or space. Traditional paper and vinyl labels often discolor or detach when exposed to heat, can scratch or mar upon contact with other materials, and often fade when exposed to direct sunlight. Candles with failed labels become visually unappealing and disappoint the consumer.

The TPM or a TPWL, e.g., an FIV label, of the invention is long lasting and visually appealing. The metallic flecks in the vinyl material give the TPM or a TPWL, e.g., an FIV label, of the invention a shimmery, glittery, diamond-like appearance. The attractive shimmery appearance is retained for the entire life of the CTCA. The thermally protective TPM or a TPWL, e.g., an FIV label, of the invention is impervious to the effects of heat and thus does not detach or discolor during use. The dual UV/AB protects the label from fading in direct sunlight and from scratches or marring upon contact with other surfaces. The long lasting and visually appealing TPM or a TPWL, e.g., an FIV label, of the invention maintains the appearance and attractiveness of a candle, enhancing the overall candle experience.

In-Use Appeal

One of the most appealing aspects of burning a candle is viewing and enjoying the flicker of the candle flame. The flame of a burning container candle is most easily viewed and appreciated when the candle container is clear, unlabeled glass. However, a container candle prepared in clear glass may reach unsafe temperatures for handling and for contact with materials, and may even shatter or break. Consumers may attempt to increase the safety of container candles by placing them in metal holders for burning, which may obscure the view of the candle flame. Candles with blocked views of the flickering candle flame detract from the candle enjoyment experience.

The translucent TPM or a TPWL, e.g., an FIV label, of the invention allows the consumer to safely view and appreciate the candle flame at all times. The shimmery, glittery, diamond-like appearance of the TPM or a TPWL, e.g., an FIV label, of the invention adds to the ambiance of the candle flame, enhancing the overall candle experience.

Safety

As discussed previously, the TPM or a TPWL, e.g., an FIV label, of the invention, when encircling or surrounding a candle, e.g., a cool-touch thermally-protected candle, improves the safety profile of the candle. For example, the thermally protective nature of the TPM or a TPWL, e.g., an FIV label, of the invention reduces the external and wax temperatures reached by a candle in use. A candle that is safer to use, e.g., to ignite and burn, provides the consumer with less worrisome and more enjoyable candle experience.

The cool-touch thermally-protected candle assembly of the invention, e.g., a container candle securely encircled or surrounded by the thermally-protective materials of the invention, or labels or wrapped prepared therefrom, exhibits an enhanced experience profile. While in use, a CTCA according to the present invention provides an evenly burning candle with improved hot throw and a reduced likelihood of tunneling, extended burn time, increased container integrity, increased visual and in-use appeal, and an increased safety profile, as compared to an identical candle prepared without the TPM or a TPWL, e.g., an FIV label, of the invention.

VII. A Method to Repair Tunneled Candles

The present invention relates to compositions for repairing and restoring a tunneled candle, e.g., a pure soy wax candle, or e.g., a paraffin wax candle. In a tunneled candle, the candle wick resides in a well or cavern in the solid wax situated below the uppermost surface of the unburned wax. In this condition, the flame is unable to melt the wax to form a pool and the candle self-extinguishes. The TPM or a TPWL, e.g., an FIV label, of the invention, when encircling or surrounding the container of a container candle, functions to restore a tunneled candle to a useable and burnable form.

As discussed earlier, the metal flecks of the vinyl of the TPM or a TPWL, e.g., an FIV label, of the invention allow the reflection and diffusion of heat from the candle flame and heated fuel back into the contents of the candle, e.g., the wax. This reflection and return of heat aids in warming and softening the wax in the candle, eventually allowing for melting of the wax surrounding the wick, allowing for even pool formation, and restoring the tunneled candle to a useable and burnable form.

Exemplification

The skilled artisan would know and appreciate that the examples provided herein are non-limiting, and that any suitable machines capable of thermally pressing, thermally assembling, printing upon, and/or cutting the vinyl material comprising metal flecks employed in preparing the TPM or a TPWL, e.g., an FIV label, of the invention may be utilized. The skilled artisan would also know and appreciate that any suitable combination of any type of fuel, e.g., wax, wick, container, and fragrance, either assembled by the artisan or purchased pre-assembled, may be employed in preparing the CTCA of the invention.

Example I. Preparation of the Thermally-Protective Material (TPM)

Thermal assembly can be and was utilized to prepare the thermally protective materials of the invention that resist the absorption of heat, and labels or wraps made therefrom. The adhesive vinyl material comprising metal flecks, when subjected to thermal pressing or thermal assembly processing, exhibits thermally-protective properties, e.g., the ability to absorb and reflect heat, to a greater extent than pristine adhesive vinyl material comprising metal flecks. The thermally assembled materials also become altered in appearance; exhibiting an increased crystal or sparkle effect that is visually appealing.

A. Thermal Assembly with Thermal Printing

Printing and Assembly Processes of the Multi-Layered TPM

In a first step, the Frosted Ice Vinyl was thermally printed upon with one, two, three or more applications, e.g., colors, of thermally responsive translucent or opaque foil resin ink. In this example, a GERBER EDGE® Thermal Printer was used essentially according to manufacturer's directions to apply three different colors of translucent foil resin ink to the Frosted Ice Vinyl. Prior to printing, the Frosted Ice Vinyl was cut to fit the GERBER EDGE® Thermal Printer and holes were punched along the edges of the vinyl to allow the vinyl to fit upon the sprockets for feeding into the printer. The maximum heat and pressure settings were used to apply the maximum number of dots of translucent foil resin per inch. The thermally-printable vinyl material comprising metal flecks, i.e. Frosted Ice Vinyl (also known as Frosted Crystal Vinyl), was purchased from CorrectSpec (Poughkeepsie, N.Y.).

The GERBER EDGE® Thermal Printer utilizes a combination of a punch pattern and thermal print head to melt the translucent foil resin ink into a material, e.g., thermally-printable vinyl material. Each color of translucent foil resin was melted into the Frosted Ice Vinyl independently, in a single application, and in a single passage, through the GERBER EDGE® Thermal Printer. In this example, three passes were used to independently thermally print translucent brown, translucent gold, and translucent green foil resin into the Frosted Ice Vinyl. In addition to printing the user-directed design into the Frosted Ice Vinyl, the GERBER EDGE® Thermal Printer prints a bulls eye registration mark which was later used to align the machine to cut the TPM into wraps or labels of the desired size and shape.

In a second step, following thermal printing of the desired design into the Frosted Ice Vinyl, the printed vinyl was passed through the GERBER EDGE® Thermal Printer at least one more time to become thermally assembled with at least one layer of transparent UV guard/abrasion-resistant material (UV/AB). In this example, the printed label was thermally assembled one layer of Frogskin™, a transparent UV guard/abrasion-resistant material.

The TPM of the invention has the appearance and feel of a single layer of material as the components of the material, e.g., the Frosted Ice Vinyl, foil resins, and Frogskin™, were each adhered to one another via a thermal assembly process. The multi-layered, thermally-printed upon, adhesive vinyl material comprising metal flecks, e.g., the FIV label comprising aluminum metal flecks, prepared according to this method becomes altered in appearance; the vinyl material exhibits an increased crystal or sparkle effect that is visually appealing. The material also exhibits thermally-protective properties, e.g., the ability to absorb and reflect heat.

Plotting and Cutting Processes

The printed TPM of the invention was next passed through a Gerber enVision Plotter according to manufacturer's directions. The Gerber enVision Plotter is an electronic sprocket fed plotting machine that feeds material directly from the GERBER EDGE® Thermal Printer. The aforementioned bull's eye registration marks were used to sight the Gerber enVision Plotter to ensure precise cutting of the material into a thermally-protective candle wrap or label of the desired shape and size.

The plotting machine utilizes measurements of the candle container, e.g., height and circumference, to precisely laser cut the TPM into labels that were sized and shaped to completely encircle the candle container. Following cutting, excess material was removed, leaving behind wraps or labels, e.g., FIV labels, which were ready to be applied to any target surface, e.g., a candle container useful to prepare a container candle, e.g., the cool-touch thermally-protected candle assembly of the invention.

B) Thermal-Assembly without Printing

A multi-layered, thermally-protective material was also prepared in a blank or unprinted form.

In a first step, the Frosted Ice Vinyl was passed through the GERBER EDGE® Thermal Printer and was thermally assembled with least one layer of transparent UV guard/abrasion-resistant material, e.g., Frogskin™. In this example, the blank Frosted Ice Vinyl was thermally assembled with one layer of transparent Frogskin™ material atop of the Frosted Ice Vinyl. Plotting and cutting of the material was carried out as described.

C) Thermal-Printing without Thermal Assembly

A single-layered thermally-protective material was prepared by thermally-printing upon the Frosted Ice Vinyl.

The Frosted Ice Vinyl was passed through the GERBER EDGE® Thermal Printer and was subjected to the heat and pressure conditions of thermal printing, but no transparent UV/AB material was applied. Plotting and cutting of the material was carried out as described.

D) Thermal-Pressing without Thermal Printing or Thermal Assembly

The single-layered thermally-protective material may also be prepared in a blank or unprinted form.

In a first step, the Frosted Ice Vinyl is passed through the GERBER EDGE® Thermal Printer and is subjected to the heat and pressure conditions of thermal printing but no inks and no transparent UV/AB materials were applied. Plotting and cutting of the material is carried out as described.

Example II. Preparation of the Cool-Touch Candle Assembly (CTCA)

The cool-touch candle assemblies described in this example comprise 99.9% soy wax, that is, essentially pure soy wax, and one lead-free cotton wick.

The candle containers, glass jars in this example, were fitted with German engineered RDD series cotton wicks. RDD wicks were selected for their consistent burn, small gauge size, and higher core temperature compared to other wicks available. The RDD wicks work synergistically with the insulating, reflective and diffusive thermal properties of the TPM or a TPWL, e.g., an FIV label, of the invention.

Glass jars holding 16 or 9 ounces were used. Wicks RDD-47 and RDD-40 were used for the 16 ounce and 9 ounce candles, respectively. Each wick was centered into and onto the bottom of the candle container and fixed in place with wick sticking glue.

Golden Brands 444 Pure Soy Wax was melted to a temperature of about 150° F. at which the wax was liquid and molten. Scented fragrance and/or essential oils, or combinations thereof, were added at a concentration of about 6% to about 10%, weight to weight, of the soy wax fuel of the candle. The scented wax was quickly cooled to about 110° F.; rapid cooling of the wax ensures that the most scent possible remains infused within the wax. The cooler wax is also less likely to dislodge the wick glued into the candle container receiving the wax.

The wax was poured into the container and the candle was allowed to rest for approximately 10 minutes. After about 10 minutes, the wick was fed through a hole in the center of a thin, flat, small, square-shaped piece of wood; the wood rested atop the edges of the candle container opening and the wick was pulled through to extend above the surface of the wooden piece. The wick was gently pulled upon while a wick centering tool was gently slid down along the wick until it was firmly gripping the wick and was pressed against the wooden piece. The candle was allowed to further solidify and set in a cool, dark environment for approximately 24 hours. After 24 hours, the pin and wooden piece were removed and the wick was trimmed to be level with the rim of the glass.

The TPM or a TPWL, e.g., an FIV label, may be applied to the candle container before pouring the wax, e.g., to an empty glass jar, or after pouring the wax, and after which the wax has solidified, e.g., approximately 24 hours or more after pouring. In this example, labels prepared from printed TPM were adhered to the outer glass wall of the candle container approximately 24 hour after pouring the wax. A mixture of 95% water and 5% dish soap, preferably unscented and dye-free, was used to aid in label placement. The glass jar was heated slightly with a commercial heat gun then lightly coated in the water/soap mixture. The printed TPM or TPWL, e.g., an FIV label, of the invention was peeled from the support material and applied to the glass such that the innermost adhesive layer was in close contact with the surface of the candle container.

The watery soap and heated glass allowed slip for the TPM or TPWL, e.g., an FIV label, of the invention to be repositioned and properly placed. Once the label was in the desired position, an applicator tool was used to press the TPM or TPWL, e.g., an FIV label, of the invention to the glass and to push out any residual watery soap and/or air bubbles. The labeled container, with or without wax, is allowed to further set and dry.

The label or wrap may be of any size and shape to fit on and/or surround the candle container. In this example, a printed TPM or TPWL, e.g., an FIV label, of the invention of the size and shape to completely encircle the glass container was applied to a wax-filled container. The completed CTCA was allowed to set for approximately 24 hours, or more, after labeling.

Example III. Assessment of Safety Profile

Burn Testing—Pure Soy Candles

Different vinyl materials were tested to determine the effect of the vinyl materials upon various parameters affecting the safety of a container candle assembly comprising a single cotton wick and soy wax comprising an odorant. Additionally, variations of the adhesive vinyl material comprising metal flecks, with or without printing, and with or without UV/AB material, e.g., Frogskin™, were tested (see Table 1). A single-layer of Frosted Ice Vinyl without UV/AB guard, e.g., Frogskin™, without thermal printing, and receiving no thermal or pressure treatments, is referred to as pristine Frosted Ice Vinyl.

TABLE 1

Vinyl materials; the UV/AB material tested was Frogskin ™.

| Label Material | Color | Metal flecks | UV/AB layer? | Thermally printed upon? |
|---|---|---|---|---|
| Scotchcal 220 Film 3M[o,n] | Black | No | No | No |
| Gerber Quantum[o,n] | Blue | No | No | No |
| White vinyl[o,p] | White | No | No | Yes* |
| Clear vinyl[t,p] | Clear | No | No | Yes* |
| Frogskin ™ | Milky | No | NA | No |
| Pristine Frosted Ice Vinyl | Frost | Yes | No | No |
| Frosted Ice No UV/AB, Print | Frost | Yes | No | Yes* |
| Frosted Ice UV/AB, No Print | Frost | Yes | Yes | No |
| Frosted Ice UV/AB & Print | Frost | Yes | Yes | Yes* |

[o]opaque;
[t]transparent/translucent;
[n]no printing;
[p]printed;
NA—not applicable
*thermally printed upon with 3 translucent ink colors Container candle assemblies were prepared in 9 oz and 16 oz sizes and in cylindrical glass containers. All candle assemblies in a given trial were prepared at the same time and contained scented pure soy wax from the same batch of scented wax (see Example II). The candles were divided into two groups of the same size and were fitted with labels prepared from the different vinyl materials, and from different variations of Frosted Ice Vinyl. The vinyl labels applied to each set of candles, e.g., the 9 ounce candles, were the same size. Control container candle assemblies, one of the 9 and 16 ounce sizes, were not wrapped with any type of vinyl material. See Table 1.

The candles were burned in a room prepared so as to mitigate the effects of wind or changes in air temperature, i.e., all doors were closed and windows were open only at the top. The wicks of all candles were trimmed to approximately ¼ inch before starting the experiment. Candles were placed about 6 inches apart and lit in quick succession so as to start the experiment.

The exterior temperatures of the container candle assemblies and temperatures of the wax inside each assembly were measured with a Roybi Infrared Thermometer. Temperature readings of the exterior container walls were taken by placing a piece of paper inside the candle container, just above the molten wax layer, and aiming the infrared beam at the paper. Wax temperature readings were taken by aiming the infrared beam at the molten wax, approximately equidistant between the interior wall of the container and the extinguished wick. Even burning was assessed by visual examination at each time point.

Temperatures were recorded at time 0, at approximately 1, 2, 3, 4, and 5 hours after ignition, and approximately every 5 hours thereafter until the fuel was exhausted. For each data point, the flame of a given candle assembly was extinguished, the temperatures of the container and the melted, molten wax were quickly measured, and the wick was relit to continue the experiment. When necessary, the wicks were trimmed to approximately ¼ inch before being relit. The results are reported in Tables 2 to 6.

TABLE 2

Maximum external temperatures, wax temperatures, and burn times of soy wax candles encircled by various vinyl materials. The UV/AB material tested was Frogskin ™.

| | Maximum External Temps (° F.) | | Maximum Molten Wax Temps (° F.) | | Burn Time (hours) | |
|---|---|---|---|---|---|---|
| Label Material | Trial 1 | Trial 2 | Trial 1 | Trial 2 | Trial 1 | Trial 2 |
| 9 ounce candle | | | | | | |
| Glass control | 151.5 | 167.3 | 177.8 | 185.2 | 50 | 50 |
| Scotchcal 220 Film 3M[o,n] | 182 | 185.2 | 194 | 218 | 45 | 45 |
| Gerber Quantum[o,n] | 154.2 | 168 | 182 | 174 | 50 | 50 |
| White vinyl[o,p] | 168 | 157.6 | 185.9 | 174.7 | 40 | 40 |
| Clear vinyl[t,p] | 159.4 | 165.2 | 169 | 168.5 | 45 | 45 |
| Frogskin ™ | | 166.8 | | 174.7 | | 40 |
| Pristine Frosted Ice Vinyl | | 144.3 | | 183 | | 60 |
| Frosted Ice No UV/AB, Print | 137.5 | 135.3 | 166.1 | 166.5 | 60 | 60 |
| Frosted Ice UV/AB, No Print | 149 | | 164.7 | | 55 | |
| Frosted Ice UV/AB & Print | 135 | 132 | 157.8 | 152.4 | 60 | 60 |
| 16 ounce candle | | | | | | |
| Glass control | 158 | 157.6 | 168 | 169.5 | 70 | 65 |
| Scotchcal 220 Film 3M[o,n] | 158.5 | 157.8 | 186.6 | 167.9 | 65 | 65 |
| Gerber Quantum[o,n] | 161.2 | 161.4 | 184.1 | 170.1 | 65 | 70 |
| White vinyl[o,p] | 166.7 | 169.6 | 173.4 | 179 | 60 | 55 |
| Clear vinyl[t,p] | 158 | 168.2 | 167.7 | 177.4 | 55 | 60 |
| Frogskin ™ | | 176 | | 188.6 | | 60 |
| Pristine Frosted Ice Vinyl | | 139.1 | | 166.8 | | 80 |
| Frosted Ice No UV/AB, Print | 137 | 136 | 167 | 173.1 | 70 | 75 |
| Frosted Ice UV/AB, No Print | 151 | | 161.8 | | 80 | |
| Frosted Ice UV/AB & Print | 134.8 | 130.5 | 152.6 | 163.6 | 95 | 100 |

[o]opaque;
[t]transparent/translucent;
[n]no printing;
NA—not applicable
[p]thermally printed upon with 3 translucent ink colors

TABLE 3

Average external temperatures, wax temperatures, and burn times of soy wax candles encircled by various vinyl materials. The UV/AB material tested was Frogskin ™.

| Label Material | Even burn | Avg Max External Temp (° F.) | Avg Max Wax Temp (° F.) | Avg Burn Time (hours) |
|---|---|---|---|---|
| 9 ounce candle | | | | |
| Glass control | No | 159.4 | 181.5 | 50 |
| Scotchcal 220 Film 3M[o,n] | Yes | 183.6 | 206 | 45 |
| Gerber Quantum[o,n] | No | 161.1 | 178 | 50 |
| White vinyl[o,p] | Yes | 162.8 | 180.3 | 40 |
| Clear vinyl[t,p] | No | 162.3 | 168.75 | 45 |
| Frogskin ™[^] | No | 166.8 | 174.7 | 40 |
| Pristine Frosted Ice Vinyl[^] | Yes | 144.3 | 183 | 60 |
| Frosted Ice No UV/AB, Print | Yes | 136.4 | 166.3 | 60 |
| Frosted Ice UV/AB, No Print[^] | Yes | 149 | 164.7 | 55 |
| Frosted Ice UV/AB & Print | Yes | 133.5 | 155.1 | 60 |
| 16 ounce candle | | | | |
| Glass control | No | 157.8 | 168.75 | 67.5 |
| Scotchcal 220 Film 3M[o,n] | Yes | 158.15 | 177.25 | 65 |
| Gerber Quantum[o,n] | No | 161.3 | 177.1 | 67.5 |
| White vinyl[o,p] | Yes | 168.15 | 176.2 | 57.5 |
| Clear vinyl[t,p] | No | 163.1 | 172.55 | 57.5 |
| Frogskin ™[^] | No | 176 | 188.6 | 60 |
| Pristine Frosted Ice Vinyl[^] | Yes | 139.1 | 166.8 | 80 |
| Frosted Ice No UV/AB, Print | Yes | 136.5 | 170.05 | 72.5 |
| Frosted Ice UV/AB, No Print[^] | Yes | 151 | 161.8 | 80 |
| Frosted Ice UV/AB & Print | Yes | 132.65 | 158.1 | 97.5 |

[o]opaque;
[t]transparent/translucent;
[n]no printing;
NA—not applicable
[p]thermally printed upon with 3 translucent ink colors
[^]n = 1

TABLE 4

Average change in external temperatures, wax temperatures, and total burn times of soy wax candles relative to candles encircled by the thermally printed upon Frosted Ice Vinyl with UV/AB guard (FIV label). The UV/AB material tested was Frogskin ™.

| Label Material | Even burn | Avg % Increase Max External Temp (° F.) | Avg % Increase Max Wax Temp (° F.) | Avg % Decrease Burn Time (hours) |
|---|---|---|---|---|
| 9 ounce candle | | | | |
| Glass control | No | 19.4% | 17.0% | 16.7% |
| Scotchcal 220 Film 3M[o,n] | Yes | 37.5% | 32.8% | 25.0% |
| Gerber Quantum[o,n] | No | 20.7% | 14.8% | 16.7% |
| White vinyl[o,p] | Yes | 21.9% | 16.2% | 33.3% |
| Clear vinyl[t,p] | No | 21.6% | 8.8% | 25.0% |
| Frogskin ™[^] | No | 24.9% | 12.6% | 33.3% |
| Pristine Frosted Ice Vinyl[^] | Yes | 8.1% | 18.0% | 0.0% |
| Frosted Ice No UV/AB, Print | Yes | 2.2% | 7.2% | 0.0% |
| Frosted Ice UV/AB, No Print[^] | Yes | 11.6% | 6.2% | 8.3% |
| Frosted Ice UV/AB & Print | Yes | 0.0% | 0.0% | 0.0% |
| 16 ounce candle | | | | |
| Glass control | No | 19.0% | 6.7% | 30.8% |
| Scotchcal 220 Film 3M[o,n] | Yes | 19.2% | 12.1% | 33.3% |
| Gerber Quantum[o,n] | No | 21.6% | 12.0% | 30.8% |
| White vinyl[o,p] | Yes | 26.8% | 11.4% | 41.0% |
| Clear vinyl[t,p] | No | 23.0% | 9.1% | 41.0% |
| Frogskin ™[^] | No | 32.7% | 19.3% | 38.5% |
| Pristine Frosted Ice Vinyl[^] | Yes | 4.9% | 5.5% | 17.9% |
| Frosted Ice No UV/AB, Print | Yes | 2.9% | 7.6% | 25.6% |
| Frosted Ice UV/AB, No Print[^] | Yes | 13.8% | 2.3% | 17.9% |
| Frosted Ice UV/AB & Print | Yes | 0.0% | 0.0% | 0.0% |

[^]n = 1

TABLE 5

External temperatures (° F.) of lit and burning soy wax candles from time 0 to 10 hours. The UV/AB material tested was Frogskin ™.

| Label Material | 0 hr | 1 hr | 2 hr | 3 hr | 4 hr | 5 hr | 10 hr |
|---|---|---|---|---|---|---|---|
| 9 ounce candle | | | | | | | |
| Glass control | 69.8 | 111.7 | 113.9 | 111.2 | 109.6 | 106.3 | 125.6 |
| Frogskin ™ | 69.6 | 102.6 | 100.9 | 105.4 | 108 | 121.4 | 123.4 |
| Pristine Frosted Ice Vinyl | 69.6 | 105.6 | 102.7 | 106.3 | 113.7 | 108.9 | 119.7 |
| Frosted Ice No UV/AB, Print | 69.6 | 89.4 | 102 | 104.4 | 108 | 109.2 | 114 |
| Frosted Ice UV/AB & Print | 69.6 | 87.3 | 98 | 96.6 | 94.5 | 103 | 106.9 |
| 16 ounce candle | | | | | | | |
| Glass control | 69.6 | 100.2 | 106.3 | 117.7 | 125.8 | 123.4 | 132 |
| Frogskin ™ | 69.6 | 89.4 | 99.5 | 101.7 | 104.8 | 105.4 | 115.9 |
| Pristine Frosted Ice Vinyl | 69.6 | 96.3 | 106.2 | 110.8 | 114 | 104.2 | 111 |
| Frosted Ice No UV/AB, Print | 69.6 | 85.3 | 99.5 | 97.6 | 96.8 | 100 | 108.5 |
| Frosted Ice UV/AB & Print | 69.6 | 76 | 86.7 | 92.9 | 95.7 | 97.7 | 95.4 |

TABLE 6

Melted/molten wax temperatures (° F.) of lit and burning soy wax candles from time 0 to 10 hours. The UV/AB material tested was Frogskin ™.

| Label Material | 0 hr | 1 hr | 2 hr | 3 hr | 4 hr | 5 hr | 10 hr |
|---|---|---|---|---|---|---|---|
| 9 ounce candle | | | | | | | |
| Glass control | NA | 144.1 | 147.3 | 150.1 | 159.8 | 162.3 | 167.5 |
| Frogskin ™ | NA | 146.8 | 147.2 | 151.5 | 159.3 | 169.9 | 170.2 |
| Pristine Frosted Ice Vinyl | NA | 140.2 | 143.4 | 147.7 | 153.9 | 158.1 | 176.4 |
| Frosted Ice No UV/AB, Print | NA | 123.8 | 141.8 | 133 | 126.8 | 156.9 | 150.4 |

TABLE 6-continued

Melted/molten wax temperatures (° F.) of lit and burning soy wax candles from time 0 to 10 hours. The UV/AB material tested was Frogskin ™.

| Label Material | 0 hr | 1 hr | 2 hr | 3 hr | 4 hr | 5 hr | 10 hr |
|---|---|---|---|---|---|---|---|
| Frosted Ice UV/AB & Print | NA | 120.2 | 136.2 | 138.9 | 144.5 | 131.2 | 145.2 |
| *16 ounce candle* | | | | | | | |
| Glass control | NA | 143.8 | 145.8 | 152.3 | 157.1 | 159.8 | 163.8 |
| Frogskin ™ | NA | 146.3 | 152.6 | 155.1 | 156.4 | 161.3 | 159.4 |
| Pristine Frosted Ice Vinyl | NA | 130.1 | 144.1 | 145.3 | 143.4 | 143.2 | 166.8 |
| Frosted Ice No UV/AB, Print | NA | 129.2 | 136.9 | 140 | 146.3 | 146.1 | 144.7 |
| Frosted Ice UV/AB & Print | NA | 116.4 | 131.7 | 138 | 140.7 | 138.6 | 145.9 |

Results for Soy Wax Candle Testing—Tables 2, 3, 4, 5, and 6

Burn Time:

In all instances, the 9 and 16 ounce candles encircled by the multi-layered, thermally printed upon Frosted Ice Vinyl comprising an external layer of Frogskin™ UV/AB guard, the FIV label, burned longer than the unwrapped control candle as well as all candles wrapped in vinyl materials lacking metal flecks (see Tables 2, 3 and 4). The 9 ounce soy candle encircled by the FIV label burned an average of 10 hours, or 16.7%, longer than the unwrapped control candle. Compared to other vinyl materials lacking metal flecks, the 9 ounce soy candle encircled by the FIV label burned an average of 10 to 20 hours, or 16.7% to 33.3%, longer. The 16 ounce soy candle encircled by the FIV label burned an average of 30 hours, or 30.8%, longer than the unwrapped control candle. Compared to other vinyl materials lacking metal flecks, the 16 ounce soy candle encircled by the FIV label burned an average of 30 to 40 hours, or 30.8% to 41%, longer.

Variations of Frosted Ice Vinyl, with or without printing, and with or without the Frogskin™ UV/AB guard, were also tested. In all experiments, the 16 ounce soy wax candle encircled by the FIV label burned longer than soy wax candles encircled by pristine Frosted Ice Vinyl, thermally-printed upon Frosted Ice Vinyl without Frogskin™ UV/AB guard, and Frosted Ice Vinyl with Frogskin™ UV/AB guard but without printing. As shown in Tables 2, 3 and 4, the 16 ounce soy candle wrapped in the FIV label burned 17.5 hours, or 17.9%, longer than the candles wrapped in pristine Frosted Ice Vinyl or Frosted Ice Vinyl with Frogskin™ UV/AB guard but without printing. The 16 ounce candle wrapped in the FIV label guard burned 25 hours or 25.6% longer than candles wrapped in thermally-printed upon Frosted Ice Vinyl without Frogskin™ UV/AB guard.

The FIV label of the invention exhibited lesser effects upon the burn times of the 9 ounce soy candles. The 9 ounce candles wrapped in the FIV label burned 5 hours or 8.3% longer than candles encircled by thermally-printed upon Frosted Ice Vinyl without Frogskin™ UV/AB guard. Candles wrapped in the FIV label as well as candles encircled with pristine Frosted Ice Vinyl or Frosted Ice Vinyl Frosted Ice Vinyl wrap comprising an external layer of Frogskin™ UV/AB guard but without printing, all burned 60 hours.

Maximum External Temperature:

In all instances, the 9 and 16 ounce soy candles encircled by the FIV label exhibited a cooler average maximum external temperature as compared to the unwrapped control candles, candles encircled by vinyl materials lacking metal flecks, as well as candles encircled by pristine Frosted Ice Vinyl, and all variations of Frosted Ice Vinyl wrap with or without printing, or with or without the Frogskin™ UV/AB guard (see Tables 2, 3, and 4).

The average maximum external temperatures of the unwrapped 9 and 16 ounce control soy candles reached 159.4° F. and 157.8° F., exhibiting increases of 19.4% and 19.0%, respectively, as compared to the candles wrapped in the FIV label. The 9 ounce soy candles wrapped in vinyls lacking metal flecks reached average maximum external temperatures ranging from 161.1° F. to 183.6° F., reflecting increases of 19.4% to 37.5% as compared to the candles wrapped in the FIV label. In a similar fashion, the 16 ounce soy candles wrapped in vinyls lacking metal flecks reached average maximum external temperatures ranging from 158.1° F. to 176° F., reflecting increases of 19.2% to 32.7%.

The candles wrapped in the FIV label exhibited the greatest decrease in average maximum temperatures: the 9 ounce candled reached only 133.5° F. while the 16 ounce candle reached only 132.65° F. The 9 ounce soy wax candles encircled by pristine Frosted Ice Vinyl, thermally printed upon Frosted Ice Vinyl lacking Frogskin™ UV/AB guard, or blank Frosted Ice Vinyl with Frogskin™ UV/AB guard reached average maximum external temperatures of 144.3° F., 136.4° F., and 149° F., corresponding to increases of 8.1%, 2.2% and 11.6%, respectively, compared to candles wrapped in the FIV label. In a similar fashion, the 16 ounce soy candles encircled by pristine Frosted Ice Vinyl, thermally printed upon Frosted Ice Vinyl lacking Frogskin™ UV/AB guard, or blank Frosted Ice Vinyl with Frogskin™ UV/AB guard reached average maximum external temperatures of 139° F., 136.5° F. to 151° F., corresponding to increases of 4.9%, 2.9% and 13.8%, respectively.

Maximum Molten Wax Temperature:

In all instances, the 9 and 16 ounce soy candles encircled by the FIV label of the invention reached a cooler average maximum molten wax temperature as compared to the unwrapped control candles, candles encircled by vinyl materials lacking metal flecks, as well as candles encircled by pristine Frosted Ice Vinyl, and all variations of Frosted Ice Vinyl wrap with or without printing, or with or without the Frogskin™ UV/AB guard (see Tables 2, 3, and 4).

The average maximum molten wax temperatures of the unwrapped 9 and 16 ounce control soy candles reached 181.5° F. and 168.75° F., exhibiting increases of 17% and 6.7%, as compared to candles wrapped in the FIV label, respectively. The 9 ounce soy candles wrapped in vinyls lacking metal flecks reached average maximum molten wax temperatures ranging from 168.75° F. to 206° F., reflecting increases of 8.8% to 32.8%. In a similar fashion, the 16 ounce soy candles wrapped in vinyls lacking metal flecks reached average maximum molten wax temperatures ranging from 172.55° F. to 188.6° F., reflecting increases of 9.1% to 19.3%.

The candles wrapped in the FIV label exhibited the greatest decrease in molten wax temperatures: the 9 ounce candled reached only 155.1° F. while the 16 ounce candle reached only 158.1° F. The 9 ounce candles encircled by the different Frosted Ice Vinyl variants exhibited maximum molten wax temperatures of 164.7° F. to 183° F., corresponding to temperatures 6.2% to 18% higher than candles wrapped in the FIV label. In a similar fashion, the 16 ounce soy candles encircled by the different Frosted Ice Vinyl variants exhibited maximum molten wax temperatures of 161.8° F. to 170.5° F., corresponding to temperatures 2.3% to 7.6% higher than candles wrapped in the FIV label.

Burn Testing—Paraffin Candles

Six different paraffin wax candles were tested to determine the effect of the TPM or a TPWL, e.g., an FIV label, of the invention of the invention upon various parameters affecting the burning of, and thus the safety of, the paraffin container candles.

The paraffin container candles were paired by size: two 7 ounce candles, each with one wick; two 22 ounce candles, each with 2 wicks; and two 22 ounce candles, each with one wick. One paraffin candle from each pair was fitted with an FIV label. Control paraffin container candles, one of each size, were not wrapped.

The candles were burned in a room prepared so as to mitigate the effects of wind or changes in air temperature, i.e., all doors were closed and windows were open only at the top. The wicks of all candles were trimmed to approximately ¼ inch before starting the experiment. Candles were placed approximately 6 inches apart and lit in quick succession so as to start the experiment.

The exterior temperatures of the container candle assemblies and temperatures of the wax inside each assembly were measured with a Roybi Infrared Thermometer. Temperature readings of the exterior container walls were taken by placing a piece of paper inside the candle container, just above the molten wax layer, and aiming the infrared beam at the paper. Wax temperature readings were taken by aiming the infrared beam at the molten wax, approximately equidistant between the interior wall of the container and the extinguished wick. Even burning was assessed by visual examination at each time point.

Temperatures were recorded at time 0, at approximately 1, 2, 3, 4, and 5 hours after ignition, and approximately every 5 hours thereafter until the fuel was exhausted. For each data point, the flame of a given candle assembly was extinguished, the temperatures of the container and the melted, molten wax were quickly measured, and the wick was relit to continue the experiment. When necessary, the wicks were trimmed to approximately ¼ inch before being relit. The results are reported in Tables 7 to 8.

TABLE 7

Maximum external temperatures, wax temperatures, and total burn times of paraffin wax candles. The UV/AB material tested was Frogskin ™.

| Label Material | Even burn | Max External Temp (° F.) | Max Wax Temp (° F.) | Burn Time (hours) |
|---|---|---|---|---|
| 7 ounce candle 1 wick | | | | |
| Glass control | Yes | 157.4 | 168.1 | 45 |
| Frosted Ice UV/AB & Print | Yes | 137.1 | 151.9 | 55 |
| 22 ounce candle 2 wicks | | | | |
| Glass control | Yes | 185 | 207.9 | 70 |
| Frosted Ice UV/AB & Print | Yes | 176.4 | 200.7 | 75 |
| 22 ounce candle 1 wick | | | | |
| Glass control | Yes | 145 | 148 | 110 |
| Frosted Ice UV/AB & Print | Yes | 135 | 150 | 105 |

TABLE 8

Change in external temperatures, wax temperatures, and total burn times of paraffin wax candles relative to candles encircled by the thermally printed upon Frosted Ice Vinyl with UV/AB guard (FIV label). The UV/AB material tested was Frogskin ™.

| Label Material | % Increase Max External Temp (° F.) | % Increase Max Wax Temp (° F.) | % Increase Burn Time (hours) |
|---|---|---|---|
| 7 ounce candle 1 wick | | | |
| Glass control Frosted Ice UV/AB & Print | 14.8% | 10.7% | 18.2% |
| 22 ounce candle 2 wicks | | | |
| Glass control Frosted Ice UV/AB & Print | 4.9% | 3.6% | 6.7% |
| 22 ounce candle 1 wick | | | |
| Glass control Frosted Ice UV/AB & Print | 7.4% | 1.3% | 4.8% |

Results for Paraffin Wax Candle Testing—Tables 7 and 8

Burn Time:

The 7 ounce 1 wick and 22 ounce 2 wick candles encircled by the thermally printed upon, FIV label of the invention each burned longer than their unwrapped counterparts. The 7 ounce candle burned 10 hours or 18.2% longer, while the 22 ounce 2 wick candle burned 5 hours or 6.7% longer, than the control candles.

Interestingly, the 22 ounce 1 wick candle encircled by the thermally printed upon, FIV label of the invention did not exhibit an increase in burn time relative to its unwrapped counterpart; the unwrapped candle burned 5 hours or 4.8% longer than its wrapped candle counterpart.

Maximum External Temperature:

All three sizes and types of paraffin wax candles encircled by the thermally printed upon, FIV label of the invention exhibited a cooler maximum external temperature as compared to the unwrapped control candles. The maximum external temperatures of the 7 ounce, 22 ounce 2 wick, and 22 ounce 1 wick candles were reduced by 20.3° F. (14.8%), 8.6° F. (4.9%), and 10° F. (7.4%), respectively.

Maximum Molten Wax Temperature:

The maximum molten wax temperatures of the 7 ounce 1 wick and 22 ounce 2 wick candles encircled by the thermally printed upon, FIV label of the invention were cooler compared to their unwrapped counterparts. The maximum molten wax temperatures of the 7 ounce and 22 ounce 2 wick candles were reduced by 16.2° F. (10.7%), and 7.2° F. (3.6%), respectively.

The maximum molten wax temperature of the 22 ounce 1 wick candle encircled by the thermally printed upon, FIV label of the invention was 2° F. or 1.3% warmer than that of the unwrapped control candle.

Discussion of Candle Testing

The thermally-protective material (TPM) of the invention, and labels or wraps prepared therefrom, resist the absorption of heat. The high-pressure, high-temperature processes of thermal printing and applying UV/AB guard material transform pristine Frosted Ice Vinyl into a thermally-protective material, e.g., an FIV label. Container candles encircled by or surrounded by the TPM of the invention, or FIV label or wraps prepared therefrom, burn at cooler temperatures and for more hours than candles lacking this material. Candles that are cooler to the touch while in use are clearly safer to burn and safer to handle. Thus, the heat-resistant properties of the FIV label allows the consumer to experience candles more safely and more enjoyably.

Cool-touch candle assemblies comprising either pure soy wax or pure paraffin wax were prepared or purchased, and encircled by FIV labels as described herein. The CTCA were lit and burned to exhaustion to evaluate the thermally-protective properties of the FIV label.

As shown in Tables 2, 3, and 4, the 9 ounce and 16 ounce pure soy wax candles wrapped with the FIV label burned approximately 17% to 31% longer than glass control candles. The wrapped candles were cool to the touch while in use, reaching maximum external temperatures ranging between approximately 130° F. to 135° F., a temperature cooler than the setting of most hot water heaters. In contrast, unwrapped control candles were much hotter to the touch, reaching maximum external temperatures ranging from about 151° F. to over 167° F. In addition, the melted and molten wax of the CTCA was cooler while the candle was in use. The maximum molten wax temperatures of the CTCA ranged from about 152° F. to about 158° F., while the maximum wax temperatures of the unwrapped candles were significantly hotter, reaching approximately 168° F. to 185° F.

Similar results were seen with paraffin wax candles. As can be seen in Tables 7 and 8, all CTCA prepared with paraffin wax were approximately 5% to 15% cooler to the touch, i.e., reached maximum external temperatures about 10° F. to 15° F. cooler, than their unwrapped counterparts. The maximum molten wax temperatures reached by two of the three sizes of paraffin candles were about 3.6% to nearly 11% cooler; these candles also exhibited burn times about 7% to about 18% longer than unwrapped glass control candles.

The CTCA prepared from a 22 ounce 1 wick paraffin candle performed somewhat differently than the other paraffin candles. The maximum external temperature reached by this particular CTCA conformation was about 7% cooler compared to its unwrapped control. Interestingly, this candle burned about 5 hours (about 4.8%) less and reached a maximum molten wax temperature nearly identical (about 2° F. or 1.3% lower) to an identical paraffin candle lacking an FIV label. The large fuel volume, high melting point, and high heat capacity of the paraffin wax in this 22 ounce 1 wick candle conformation may well have served as an ample reservoir for the heat produced during combustion such that the molten wax temperature was not significantly affected by the heat reflected and diffused back into the candle by the FIV label. In fact, the wax temperatures taken at each time point for the wrapped and unwrapped candles were generally quite close, varying on average by about 2.87° F. over the course of the experiment. It is theorized that the heat capacity of the wax reservoir also contributed to the slightly longer burn time of the unwrapped candle.

Not only does the TPM material of the invention and FIV labels prepared therefrom reduce the maximum external and wax temperatures of soy and paraffin candles, the material and labels also affect how quickly and evenly the candle heats up and burns. Tables 5 and 6 show the external and wax temperatures of 9 or 16 ounce soy wax CTCAs sampled at 1, 2, 3, 4, 5, and 10 hours. As can be seen, the external and molten wax temperatures of candles wrapped in the FIV label increase more slowly and with less variation from time point to time point. The FIV label clearly modulates and evens out the burning profile of the candle. Not only does this make the CTCA of the invention safer to burn, it results in a more even scent dispersal for an enhanced candle experience.

The thermally-protective material of the invention directly addresses the inherent safety hazards associated with burning candles. The multi-layered, thermally printed upon Frosted Ice Vinyl comprising an external layer of Frogskin™ UV/AB guard (FIV label) increases the safety profile and experience profile of any container candle. Placement of the FIV label around pure soy wax and pure paraffin wax candles transformed the candles into cool-touch candle assemblies.

The cool-touch candles exhibited enhanced safety profiles in that the candles burned evenly, were cooler to the touch, exhibited reduced maximum molten wax temperatures, and heated up and burned more evenly. CTCAs can be prepared using smaller wicks than unwrapped candles, allowing for a smaller yet more stable flame with reduced smoking, flaring, re-ignition, mushrooming, soot emission, and the like. CTCAs form wax pools quickly and evenly yet reaching cooler maximum temperatures, reducing the likelihood of flashover, uneven fuel consumption, weigh redistribution, tunneling, loss of container integrity, and the like.

Cool-touch candles also exhibit an enhanced candle experience profile. CTCAs burn evenly, with increased hot throw, allowing for a more enjoyable aromatic experience. The FIV label is an attractive, translucent label which retains its integrity for the life of the candle, allowing the user to see and enjoy the flame of the candle while in-use. CTCAs also burn longer than unwrapped candles, providing the consumer with more hours of burn time and increasing the value of the candle. The increased safety profile of the CTCAs further adds to the candle experience.

Example IV. Assessment of Candle Experience

Numerous participants burned and compared the hot throw of paraffin wax candles (lacking an FIV label) and pure soy CTCAs of the invention. In all cases, participants reported better and more even scent throw from the CTCAs of the invention as compared to unwrapped paraffin candles.

Example V. Repair of a Tunneled Candle

Tunneled paraffin and soy wax candles were fitted with the FIV label of the invention to test the ability of the label to restore the candles to useable condition. The wicks of the tunneled 16 ounce soy wax and 22 ounce paraffin wax candles resided in wells below the uppermost surface of the unburned wax. The glass containers of the tunneled candles were securely encircled with the translucent TPM or a TPWL, e.g., an FIV label, of the invention, thus forming a cool-touch thermally-protected candle assembly (CTCA). In this example, the translucent label comprised a first layer of translucent Frosted Ice Vinyl material and one outer layer of transparent Frogskin™' where the vinyl material was thermally printed upon with three colors of translucent foil ink.

The wicks of the tunneled soy and paraffin wax CTCAs were lit and allowed to burn until the soy or paraffin wax formed an even pool of molten wax across and atop the unburned wax of the candle. The candles were extinguished once an even pool of molten wax was formed. In this way, the tunneled soy and paraffin wax candles were restored to a useable and burnable form.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents were considered to be within the scope of this invention and are covered by the following claims. Moreover, any numerical or alphabetical ranges provided herein are intended to include both the upper and lower value of those ranges. In addition, any listing or grouping is intended, at least in one embodiment, to represent a shorthand or convenient manner of listing independent embodiments; as such, each member of the list should be considered a separate embodiment.

The description itself is not intended to limit the scope of this disclosure. Rather, the present invention might also be embodied in other ways, to include different steps or elements similar to the ones described herein, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

What is claimed is:

1. A multi-layered thermally-protective material comprising
    a first layer of translucent adhesive vinyl material comprising metal flecks where the metal flecks are contained within the vinyl layer of the adhesive vinyl material or where the metal flecks are dispersed within the adhesive layer of the adhesive vinyl material, wherein said vinyl material is thermally printed upon with at least one application of translucent foil ink, and
    at least one layer of a transparent UV protective and abrasion resistant material for protecting graphics from moderate contact or handling,
    wherein said metal flecks are aluminum, and
    wherein said multiple layers of material are thermally assembled to form said thermally-protective material, imparting resistance to the movement of heat to the multi-layered thermally-protective material.

2. The thermally-protective material according to claim 1, wherein said vinyl is printable.

3. The thermally-protective material claim 2, wherein translucent foil ink, opaque foil ink, or a combination thereof, is thermally printed upon said vinyl material.

4. The thermally-protective material according to claim 1, wherein said thermally-protective material is translucent.

5. The thermally-protective material according to claim 4, wherein said vinyl material is thermally printed upon with three applications of translucent foil ink.

6. A cool-touch thermally-protected candle assembly comprising
    a container,
    a fuel, and
    at least one wick,
    wherein said container is encircled by the thermally-protective material of claim 1.

7. The cool-touch thermally-protected candle assembly according to according to claim 6, wherein said fuel is wax, and wherein said wax optionally comprises an odorant.

8. A cool-touch thermally-protected candle assembly comprising
    a container,
    a wax, and
    at least one wick,
    wherein said container is encircled by the translucent, thermally-protective material of claim 4, and
    wherein said wax optionally comprises an odorant.

9. The cool-touch thermally-protected candle assembly according to claim 8, wherein
    said container is a glass container or metal container,
    said wax is selected from the group consisting of petroleum-based wax, synthetic-wax, plant-based wax, mineral wax, animal-based wax, and any other natural wax, or any combination thereof, and
    wherein said wax optionally comprises an odorant, and said wick is a single, lead-free wick.

10. The cool-touch thermally-protected candle assembly according to claim 9, wherein
    said container is a glass container,
    said plant-based wax is pure soy wax, and
    said wick is lead-free cotton.

11. The cool-touch thermally-protected candle assembly according to claim 6, prepared with about 2 to about 30 ounces of wax, inclusive.

12. The cool-touch thermally-protected candle assembly of claim 11, wherein said wax is pure soy wax.

13. The cool-touch thermally-protected candle assembly of claim 12, prepared with about 9 to about 16 ounces of soy wax, inclusive.

14. A cool-touch thermally protective candle wrap prepared from the thermally-protective material according to claim 1, wherein said wrap reduces the maximum external temperature of a burning candle by at least about 2%.

15. A cool-touch thermally protective candle wrap prepared from the thermally-protective material according to claim 1, wherein said wrap reduces the maximum molten wax temperature of a burning candle by at least about 6%.

16. A cool-touch thermally protective candle wrap prepared from the thermally-protective material according to claim 1, wherein said wrap increases candle burn time by at least about 8%.

17. A safety-enhanced candle comprising the cool-touch thermally-protected candle assembly according to claim 6.

18. An experience-enhanced candle comprising the cool-touch thermally-protected candle assembly according to claim 6.

19. A method to repair a tunneled candle comprising:
    encircling said tunneled candle with a cool-touch thermally protective candle wrap prepared from the thermally-protective material according to claim 1,
    igniting the wick of said tunneled candle, and
    burning said tunneled candle until a continuous pool of melted wax forms evenly across and atop the unburned wax of the candle, thus repairing said tunneled candle to a burnable and useable form.

* * * * *